United States Patent [19]
Busch et al.

[11] 3,989,888
[45] Nov. 2, 1976

[54] HORIZONTAL AND VERTICAL SOFT EDGE VIDEO TRANSITION SYSTEM WITH EDGE COMPRESSION

[75] Inventors: Albert E. Busch; John R. Hotsenpiller, both of Bloomington; James V. Redding, Nashville, all of Ind.

[73] Assignee: Sarkes Tarzian, Inc., Bloomington, Ind.

[22] Filed: Aug. 14, 1975

[21] Appl. No.: 604,621

[52] U.S. Cl. .............................. 178/6.8; 178/DIG. 6
[51] Int. Cl.² .......................................... H04N 5/22
[58] Field of Search ......................... 178/DIG. 6, 6.8

[56] References Cited
UNITED STATES PATENTS
3,619,495   11/1971   Ito .................................. 178/DIG. 6
3,697,681   10/1972   McCoy .......................... 178/DIG. 6

Primary Examiner—Howard W. Britton
Attorney, Agent, or Firm—Mason, Kolehmainen, Rathburn & Wyss

[57] ABSTRACT

A digital soft edge transition system for use in conjunction with a video special effects generator utilizes digital circuitry responsive to a transition signal for switching either a first video input signal or a second video input signal into a composite video output signal. An analog video switch controlled by an analog ramp generator is utilized to provide a gradual transition between the video input signals. The gradient of the transition is determined by the time constant of the charging circuit in the ramp generator which is controlled by a digital border size control circuit. The digital border size control circuit includes circuitry responsive to the distance between the border and the edge of the viewing screen for gradually reducing the width of the border as the transition approaches the edge of the screen to prevent the abrupt disappearance of the border that usually occurs in digital soft edge generators when the transition approaches the edge of the screen.

36 Claims, 24 Drawing Figures

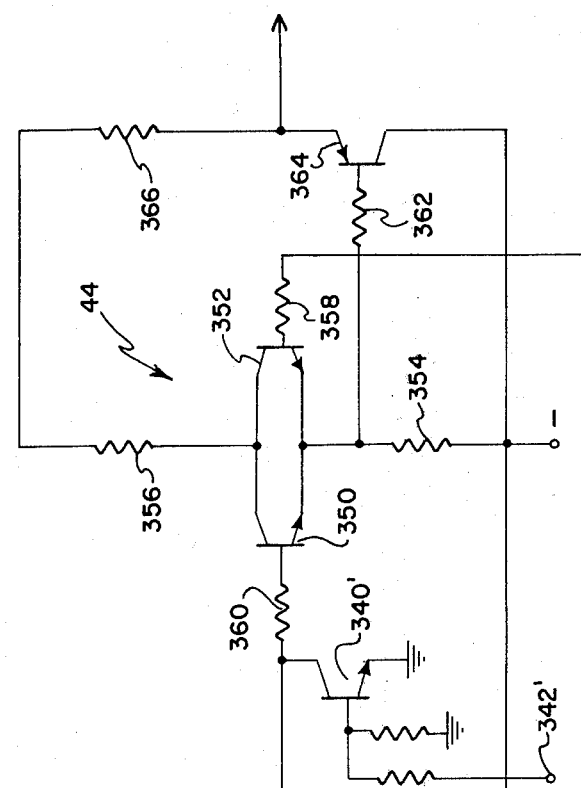
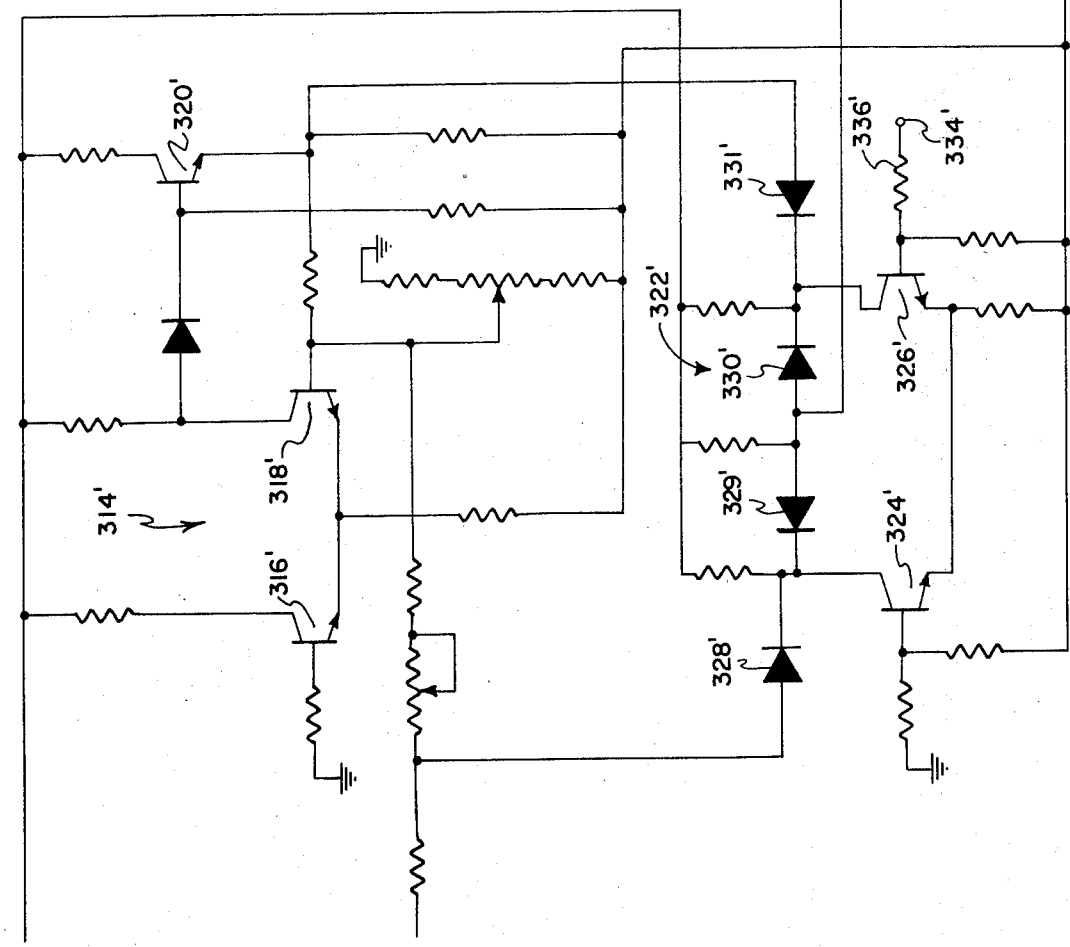
FIG. 13

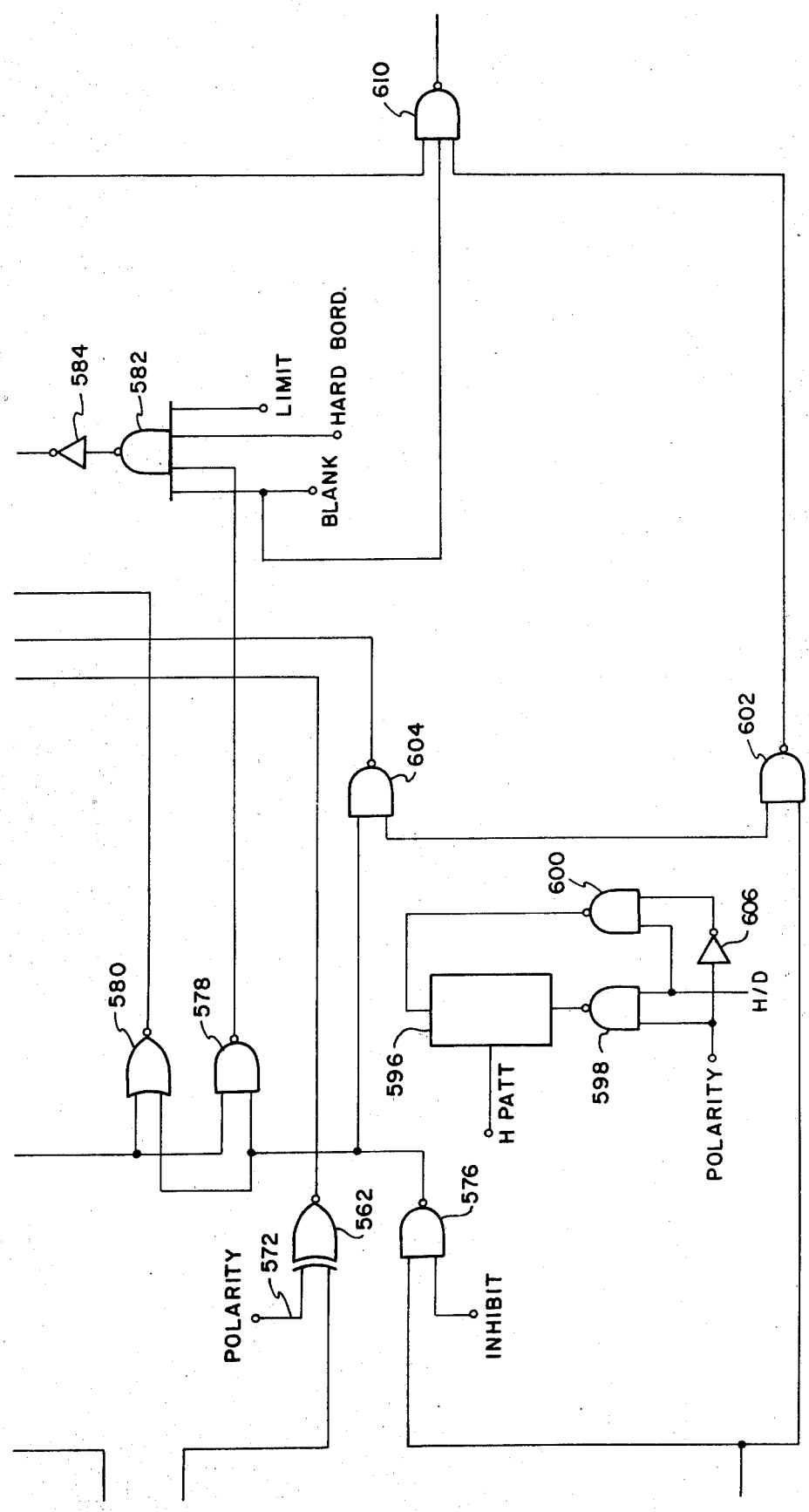

HORIZONTAL AND VERTICAL SOFT EDGE VIDEO TRANSITION SYSTEM WITH EDGE COMPRESSION

BACKGROUND OF THE INVENTION

The present invention relates generally to video special effects generators for combining multiple video input signals into a single video output signal, and more particularly to a special effects generator utilizing digital circuitry for providing a gradual transition between two video input signals switched into the video output signals.

Digital special effects generators are known. One such digital special effects generator is described in U.S. Pat. No. 3,821,468 issued June 28, 1974 to Albert E. Busch and assigned to the same assignee as the assignee of the present invention and incorporated herein by reference. While digital special effects generators such as the one described in the above-mentioned Busch patent provide a variety of special effects, transitions in the video output signal between two video input signals are abrupt, and result in a display in which a sharp line separates two video signals that are displayed adjacent to each other on the viewing screen. Such sharp transitions are desirable for many special effects; however, for other special effects such as vignette-type inserts, it is desirable to have a gradual transition between the two video signals to provide a soft edge effect in which the two video signals gradually blend into each other when displayed on the screen.

Circuits for providing a gradual transition between video signals have been constructed, such circuits utilize standard special effects generators that have been modified by adding an analog video switch that gradually increases the amplitude of one of the video signals while simultaneously decreasing the amplitude of the other video signal to provide the soft edge effect. The video switch is generally controlled by an analog delay circuit interposed between the analog switch and the circuitry driving it, or by means of a digital function generator that is controlled by the digial special effects generator.

While these techniques provide a way of achieving a gradual transition between two video signals, when a symmetrical effect such as a circle or diamond effect is selected and a soft edge is desired, the switching delay introduced by the delay circuit driving the analog video switch causes the display of the central image (i.e. a diamond or circle) to shift the direction of scanning by an amount equal to the width of the transition border. The use of a digital soft edge transition circuit such as the one described in U.S. Pat. application Ser. No. 557,067 filed Mar. 10, 1975 by Albert E. Busch, et al. and entitled "Digital Soft Edge Video Transition System," now U.S. Pat. No. 3,941,925, eliminates the undesirable shift caused by the delay circuit. However, it is a characteristic of the above Busch circuit that as the central image is gradually enlarged to the point where the border of the central image approaches the edge of the viewing screen, the transition border abruptly disappears, thus giving an undesirable "snap effect" as the size of the central image is increased. Furthermore, the above Busch system provides a soft edge transition only in the horizontal direction.

SUMMARY OF THE INVENTION

Accordingly, it is an object of the present invention to provide a new and improved video special effects generator.

It is another object of the present invention to provide an improved soft edge video transition circuit that overcomes many of the disadvantages of the prior art circuits.

It is yet another object of the present invention to provide a digital soft edge transition circuit that provides a gradual shrinking border as the transition border approaches the edge of the viewing screen.

It is yet another object of the present invention to provide a digital soft edge transition circuit that provides soft edge transitions in both the horizontal and vertical directions.

It is yet another object of the present invention to provide a soft edge border circuit that tailors the width of the transition border to the distance between the transition border and the edge of the viewing screen.

It is yet another object of the present invention to provide an improved soft edge special effects generator that utilizes an analog ramp generator controlled by digital circuitry to provide the video transition signal.

In accordance with a preferred embodiment of the present invention, digital circuitry is provided for defining the position of the horizontal and vertical transition borders. The transition border defining circuitry is similar to that utilized in the above-referenced Busch U.S. Pat. No. 3,941,925, and utilizes a pair of counters for defining the center of each line and each field. Horizontal and vertical memory counters are employed to store a mathematical representation of the distance between the completion of the first transition and the respective horizontal and vertical edges of the screen. The aforementioned horizontal and vertical memory counters are controlled by the line and field center indicating counters and serve to control border generating circuitry to cause the border generating circuitry to provide second horizontal and second vertical transition borders symmetrically displaced about the horizontal and vertical center lines of the viewing screen.

The width of the transition border is controlled by a digital border width selector that controls a vertical border size counter and a horizontal border size counter. The horizontal and vertical border size counters control respective horizontal and vertical ramp generators which cause a video switch gradually to switch between a first and a second video signal at a rate determined by the slope of the horizontal and vertical ramp signals, the latter slopes being determined by the count in the respective horizontal and vertical border size counters.

In order to achieve the reduction in width of the transition borders as the transition border approaches the edge of the viewing screen, the horizontal and vertical border counters are also controlled by the respective horizontal and vertical transition circuits from the special effects generator. The horizontal and vertical transition signals serve to limit the maximum count attainable by the respective horizontal and vertical border size counters to a value not exceeding the count corresponding to the respective horizontal and vertical distance between the edge of the viewing screen and the closest edge of the respective horizontal and vertical transition border. The reduced count in the horizontal and vertical border size counters as the edge of the viewing screen is approached results in an increase in the slope of the ramp signals provided by the horizontal and vertical ramp generators, thereby reducing the width of the transition border as the edge of the screen is approached. A nonadditive mixer or a digtal comparator is employed to select one of the outputs of the horizontal and vertical ramp generators for application to the analog video switch.

DESCRIPTION OF THE DRAWINGS

The above and other objects and advantages of the present invention are further described in the following detailed description and drawings wherein:

FIGS. 2–11 are to be positioned to best show the logic diagram illustrated therein;

FIGS. 12–15 form a schematic diagram of the ramp generator and switching circuitry controlled by the circuitry illustrated in FIGS. 2–11;

FIG. 15A illustrates how FIGS. 12–15 are to be positioned to best show the schematic diagram illustrated therein;

FIGS. 16–21 form a combined block and logic diagram of an alternative embodiment according to the invention; and FIG. 21A shows how FIGS. 16–21 are to be positioned to best show the block and logic diagram illustrated therein.

DETAILED DESCRIPTION OF THE INVENTION

GENERAL

Figure 1:
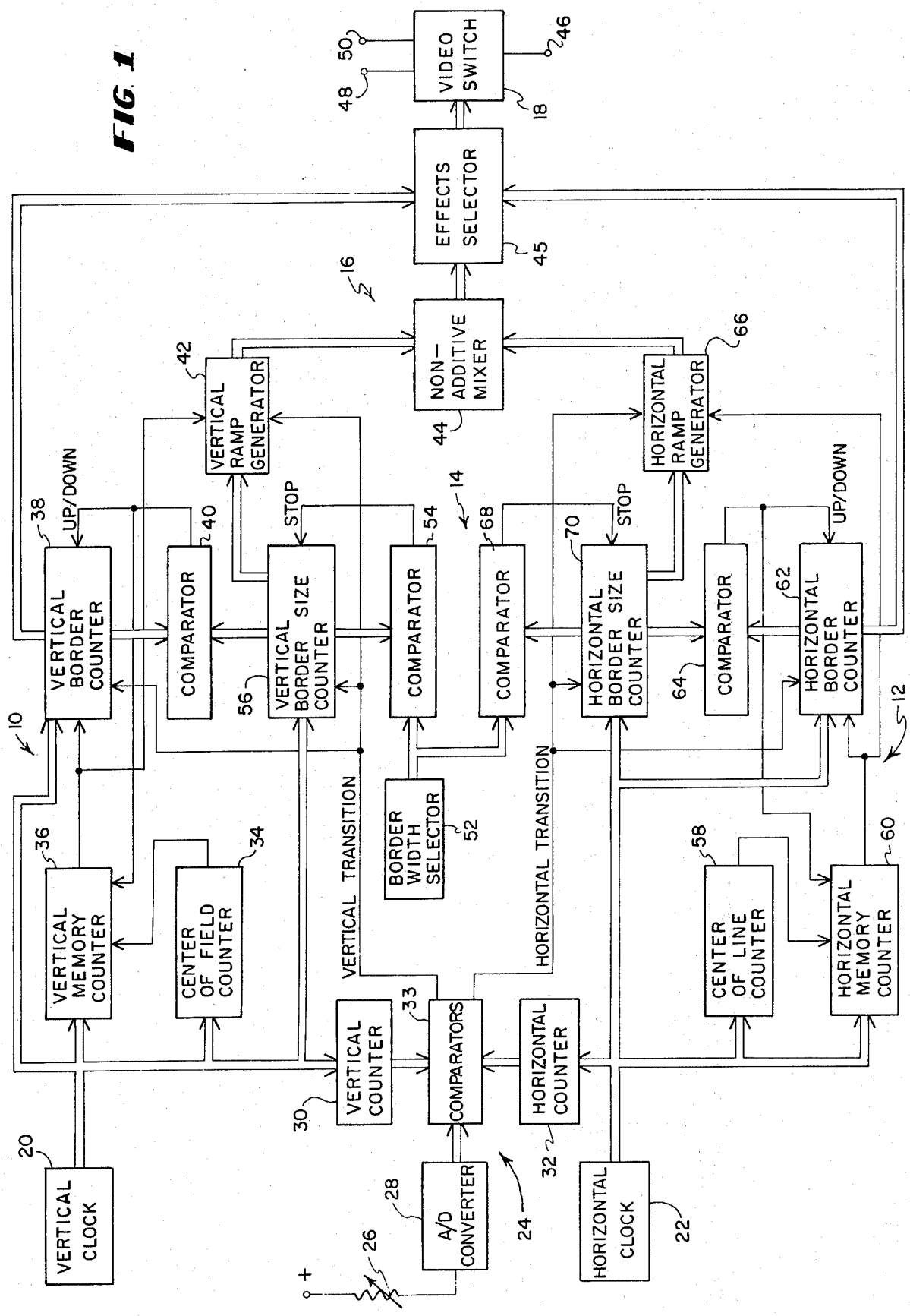
FIG. 1 is a general block diagram of the soft edge video transition circuit according to the invention.

Referring now to FIG. 1, there is shown a functional block diagram of the soft edge transition system according to the invention. The lines (particularly the double lines) interconnecting the various blocks in FIG. 1 represent a flow of signals and do not necessarily represent a direct electrical connection. The signal flow between blocks shown in FIG. 1 is designed to illustrate the operation of the system, but for practical reasons, the signals may be routed via paths other than those shown in FIG. 1 (e.g. through other blocks) in an operational system. For this reason, the interconnections between the blocks of FIG. 1 may not correspond exactly to interconnections between the various circuits illustrated in FIGS. 2–21.

The soft edge transition circuit according to the invention utilizes vertical border positioning circuitry 10 for determining the vertical position of horizontally disposed borders, horizontal border positioning circuitry 12 for determining the horizontal position of vertically disposed borders, a border width control circuit 14, ramp generating and mixing circuitry 16 and an analog video switch 18. The vertical position control circuit 10 is controlled by a vertical clock 20 that provides one pulse at the beginning of each horizontal scanning line, and the horizontal center positioning circuit 12 is controlled by a horizontal clock 22 that provides a predetermined number of pulses, for example, 512, during each horizontal scanning line interval. A digital special effects generator 24, such as the generator described in the Busch U.S. Pat. No. 3,821,468 is utilized to control the operation of the soft edge transition circuit.

The operation of the special effects generator 24 is conventional, and may be similar to the operation of the generator described in the Busch U.S. Pat. No. 3,821,468. The secial effects generator used in the present embodiment utilizes a lever controlled variable resistor 26 connected to an analog-to-digital converter 28 to provide a digital representation of the position of the control lever operating the resistor 26. A vertical counter 30 is utilized to count pulses from the vertical clock 20, and a horizontal counter 32 is utilized to count pulses from the horizontal clock 22. The outputs of the analog-to-digital converter, the vertical counter 30 and the horizontal counter 32 are applied to a set of comparators 33 that compare the digital output of the analog-to-digital converter 28 with the count present in either the vertical counter 30 or the horizontal counter 32 to provide a vertical transition signal when the count in the vertical counter 30 exceeds the value of the digital signal from the converter 28 and a horizontal transition signal when the count in the horizontal counter 32 exceeds the count provided by the converter 28. More complex patterns may be generated by comparing the signal from the converter 28 with an arbitrary combination of the counts from the counters 30 and 32, however, such effects will not be considered for reasons of simplicity.

The vertical position determining circuit 10 of the soft edge transition circuit according to the invention utilizes a center of field counter 34, a vertical memory counter 36, a vertical border counter 38, each driven by the vertical clock 20 and controlled by a comparator 40. The vertical memory counter 36 and the center of field counter 34 have a capacity equal to approximately one-half of the number of horizontal scanning lines defining each field. For example, if there are 512 lines per field, the center of field counter 34 and the vertical memory counter 36 each have a capacity of 255 counts. The vertical border counter 38 must have a capacity at least as great as the number of lines making up the widest expected horizontal border.

The operation of the vertical position determining circuit 10 is similar to the operation of the "mirror image" circuit described in the referenced Busch U.S. Pat. No. 3,941,925. At the beginning of each field, the vertical clock 20 applies pulses to the vertical memory counter 36 and to the center of field counter 34, each of which counts the number of pulses received from the clock 20 following the beginning of the field. In addition, the pulses from the vertical clock 20 are applied to the vertical border counter 38 which is rendered operative to count the vertical clock pulses upon receipt of a vertical transition signal from the comparators 33. The vertical border counter 38 counts the vertical clock pulses until a count equal to the count determined by the border width control circuit 14 is reached. At this point, the comparator 40 provides a signal to the vertical memory counter 36 to cause the counter 36 to suspend the counting of pulses from the clock 20, and simultaneously to apply a signal to the vertical border counter 38 to cause the vertical border counter 38 likewise to stop counting pulses from the clock 20 and to change the condition of operation of the counter 38 so that the counter 38 will count in the reverse direction when counting is subsequently reinitiated. At this point, the count stored in the vertical memory counter 36 is proportional to the vertical distance between initiation of the vertical scan and the termination of the transition border, and the count in the vertical border counter 38 is proportional to the width of the transition border determined by the circuit 14.

The center of field counter 34 continues to count pulses from the vertical clock 20 even though the counting of clock pulses by the counters 36 and 38 has been suspended. The center of field counter 34 continues to count until the vertical scan has reached a position corresponding to the center of field, at which point a center of field signal is applied to the vertical memory counter 36 to cause the vertical memory counter 36 to resume counting clock pulses from the clock 20 beginning with the count that was stored in the counter 36 when the counting was suspended.

The vertical memory counter 36 continues to count pulses from the clock 20 until a count corresponding to one-half of a vertical scan is reached. At this point, the vertical memory counter 36 overflows and provides a signal to the vertical border counter 38 to cause the counter 38 to resume counting in the reverse direction until a count of zero is reached.

In accordance with an important feature of the present invention, the vertical transition signal from the comparators 33 and the output signal from the vertical memory counter 36 control the operation of a vertical ramp generator 42 in the transition circuit 16. The vertical ramp generator 42 serves to control the analog video switch 18 by applying a first direction ramp signal to the video switch 18 (via a nonadditive mixer 44 and an effects selector 45) upon receipt of the vertical transition signal from the comparators 33, and by applying a second direction ramp signal to the video switch 18 upon receipt of the overflow signal from the vertical memory counter 36. The effects selector receives signals indicative of the horizontal and vertical transitions (via the horizontal and vertical border counters 38 and 62 in FIG. 1), and allows either a hard border or a soft edge border to be selected.

The slope of the ramp signal is determined by a binary signal applied to the vertical ramp generator 42 from the border width control signal 14. This causes the video switch 18 gradually to switch its output 46 from a first video input 48 to a second video input 50 upon receipt of the first direction ramp signal generated by the ramp generator 42 upon receipt of the vertical transition from the comparators 33. The input 50 is maintained electrically coupled to the output 46 until the output signal from the vertical memory counter 36 causes the vertical ramp generator 42 to generate the opposite direction ramp signal to gradually switch the output 46 from the input 50 to the input 48 to gradually apply the original video signal to the output 46. A variable time constant resistance-capacitance circuit within the vertical ramp generator 42 is controlled by the signal from the border size circuit 14 to change the slope of the ramp from the generator 42 to thereby change the rate at which the output is switched from the input 48 to the input 50. When a hard border is selected the video switch 18 is controlled by the horizontal and vertical transition signals.

The border width control circuit 14 includes a border width selector 52 that provides a binary signal indicative of the desired border width. In accordance with another important aspect of the invention, the width of the border is reduced to a width less than the width selected by the selector 52 when the border approaches the edge of the viewing screen. This is accomplished by a comparator 54 and a vertical border size counter 56 which are used to reduce the vertical width of the border when the vertical distance between the edge of the border and the edge of the viewing screen is less than the width selected by the border width selector 52. The vertical border size counter 56 counts vertical clock pulses from the clock 20, with the count beginning at the start of each field. The count from the vertical border size counter 56 is compared with the binary signal from the border width selector 52 by the comparator 54. If no vertical transition is generated in the interim by the comparators 33, the vertical border size counter continues to count until its count reaches a number equal to the binary number generated by the border width selector 52. At this point, the comparator 54 provides a signal to the counter 56 to terminate the count. The count present in the counter 56 when the count is terminated is applied to the comparator 40 and to the vertical ramp generator 42, and thus determines the final count in the counter 38 and the slope of the ramp provided by the vertical ramp generator 42. This number is equal to the binary number provided by the border width selector 52 when the distance between the edge of the border and the edge of the screen is greater than or equal to the width of the transition border.

If the edge of the transition border is spaced from the edge of the screen by an amount less than the width selected by the border width selector 52, the counting sequence of the vertical border size counter 56 is terminated by the vertical transition signal from the comparators 33 before the count in the vertical border size counter 56 reaches the value selected by the border width selector 52. This results in a smaller count being stored in the vertical border size counter 56 and a correspondingly smaller count in the vertical border counter 38. The smaller count in the counter 56 causes the ramp generator to generate a steeper ramp than the ramp that would be generated if a number equal to the number selected by the border width selector were present in the counter 56. Under these circumstances, the count in the vertical border size counter 56 is determined by the vertical transition signal rather than the signal from the border width selector 52 and results in a border having a width approximately equal to the distance between the edge of the screen and the beginning of the vertical transition.

The operation of the horizontal border position control circuit 12 is similar to the circuit of the vertical border position control 10. The horizontal border position control circuit 12 utilizes a center of line counter 58, a horizontal memory counter 60, a horizontal border counter 62 and a comparator 64, each analogous to the respective center of field counter 34, vertical memory counter 36, vertical border counter 38 and comparator 40. The center of line counter 58 provides an output upon receipt of a predetermined number of pulses from the horizontal clock 22 corresponding to the center of each scanning line. Similarly, the horizontal memory counter 60 has a capacity equal to the capacity of the center of line counter 58 and counts horizontal clock pulses from the clock 22 beginning at the start of each scanning line and ending at the end of the border transition. The horizontal border counter 62 begins to count horizontal clock pulses from the clock 22 upon receipt of a horizontal transition signal from the comparators 33 and continues to count until a count equal to to a count provided by the border width control cicuit 14 is reached. At this point, the comparator 64 provides a signal to the horizontal memory counter 60 and the horizontal border counter 62 to terminate the count. At this point, the horizontal memory counter 60 contains a count representative of the distance between the beginning of the horizontal scan and the end of the transition border, and the horizontal border counter 62 contains a number representative of the width of the transition border.

The center of line counter 58 continues to count until a count representative of the center of a horizontal scanning line is reached, at which point a signal is applied by the counter 58 to the counter 60 to reinitiate the counting of horizontal clock pulses by the counter 60. The counter 60 continues to count until it overflows, at which point, a signal is provided by the counter 60 to the counter 62 to cause the counter 62 to count in the reverse direction until a count of zero is reached. This operation is analogous to the operation of the vertical border position control circuit 10 with the exception that the horizontal border position control circuit 12 operates at a higher frequency than the circuit 10 and determines the horizontal position of vertically disposed borders.

The horizontal transition signal from the comparators 33 and the output signal from the horizontal memory counter 60 control the operation of a horizontal ramp generator 66, which is analogous to the vertical ramp generator 42. The horizontal ramp generator 66 provides a ramp signal to the video switch 18 via the nonadditive mixer 44 and the effects selector 45 to control the operation of the video switch 18. The slope of the ramp provided by the horizontal ramp generator is determined by the border width control circuit 14. As in the case of the vertical ramp generator 42, a first direction ramp is provided by the horizontal ramp generator 66 upon receipt of the horizontal transition circuit from the comparators 33, and a second direction ramp is provided upon receipt of a signal from the horizontal memory counter 60. The non-additive mixer 44 selects the larger one of the signals from the vertical ramp generator 42 and the horizontal ramp generator 66, and utilizes the larger of the two signals to drive the video switch 18 when an effect having both horizontal and vertical borders is selected.

The border width control circuit 14 utilizes a comparator 68 and horizontal border size counter 70, similar to the comparator 54 and the vertical border size counter 56, to compress the horizontal width of vertically disposed borders when one of the vertically disposed borders approaches the edge of the screen. Alternatively, the counters 56 and 70 may be cross coupled to reduce the width of all borders when the edge of any border approaches any edge of the screen.

The comparator 68 compares the value of the number selected by the border width selector 52 with the count in the horizontal border counter 70, which is driven by the horizontal clock 22. If no horizontal transition signal is received in the interim, indicative that the border is more than one border width away from the edge of the screen, the horizontal border size counter will count until it reaches a count equal in value to the number generated by the border width selector 52, at which point the comparator 68 will provide a signal to the counter 70 to terminate the count. The resultant count will then be applied to the comparator 64 which will terminate the count in the counter 62 when it reaches a value equal to the number provided by the border width selector 52, and to the horizontal ramp generator 66 to cause the generator 66 to provide a ramp having a slope corresponding to the width of the border selected by the selector 52. If a horizontal transition signal is received in the interim, indicative that the horizontal border is less then one border width away from the edge of the screen, the count in the horizontal border size counter 70 will be terminated by the horizontal transition signal, and the resulting count will have a value smaller than the number provided by the border width selector 52. As a result, the number transferred to the horizontal border counter 62 and to the horizontal ramp generator 66 will be smaller and result in a narrower width transition border as the edge of the screen is approached. For more complex patterns, such as circles, diamonds and the like, logic circuitry coupling both the vertical and horizontal transition signals to the vertical and horizontal border size counters 56 and 70 must be employed to reduce the size of both the horizontal and vertical borders whenever any one of the horizontal and vertical borders approaches any of the horizontal or vertical edges of the screen. Such logic circuitry is not shown in FIG. 1 for reasons of simplicity, however, it will be discussed briefly in a subsequent portion of this specification.

BORDER WIDTH CONTROL CIRCUITRY

Referring now to FIGS. 2–11, which show the system according to the present invention in greater detail, the vertical memory counter 36 comprises a pair of 4-bit up/down counters 102 and 104, a NAND gate 106 and a flip-flop 108. The pulses from the vertical clock 20 are applied to the counter 102 via the gate 106 which selectively passes the pulses to the counter 102 during the first half of each field prior to the termination of the transition border, and during the second half of the field until the counter 104 overflows. The operation of the gate 106 is controlled by the center of field counter 34 and the vertical border counter 38. The output of the counter 104 controls the flip-flop 108 which controls the operation of the vertical border counter 38 to initiate the reverse direction counting by the vertical border counter 38.

Figure 2:
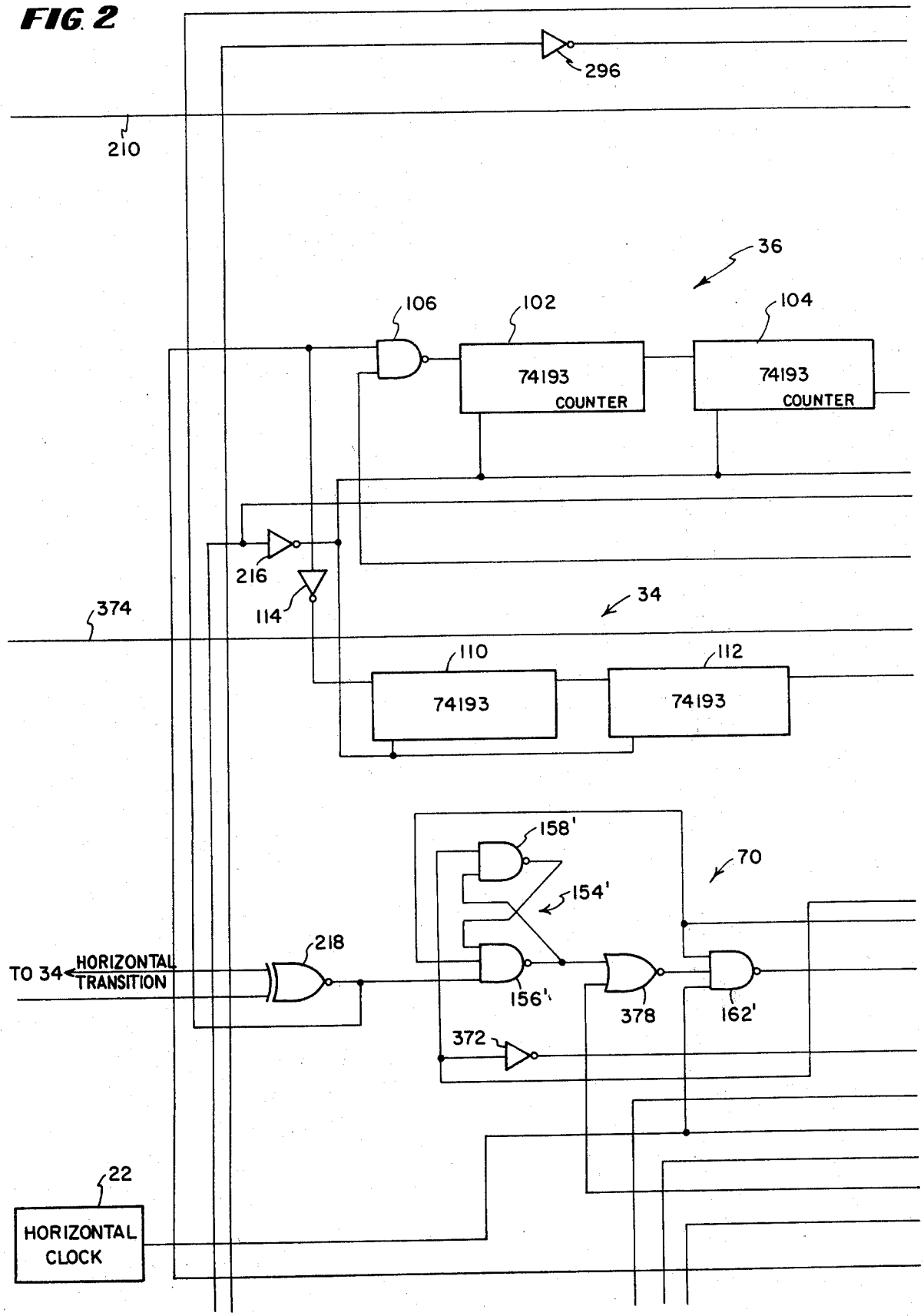
FIGS. 2–11 form a detailed logic diagram showing the operation of the horizontal and vertical border transition generating circuitry.
Figure 3:
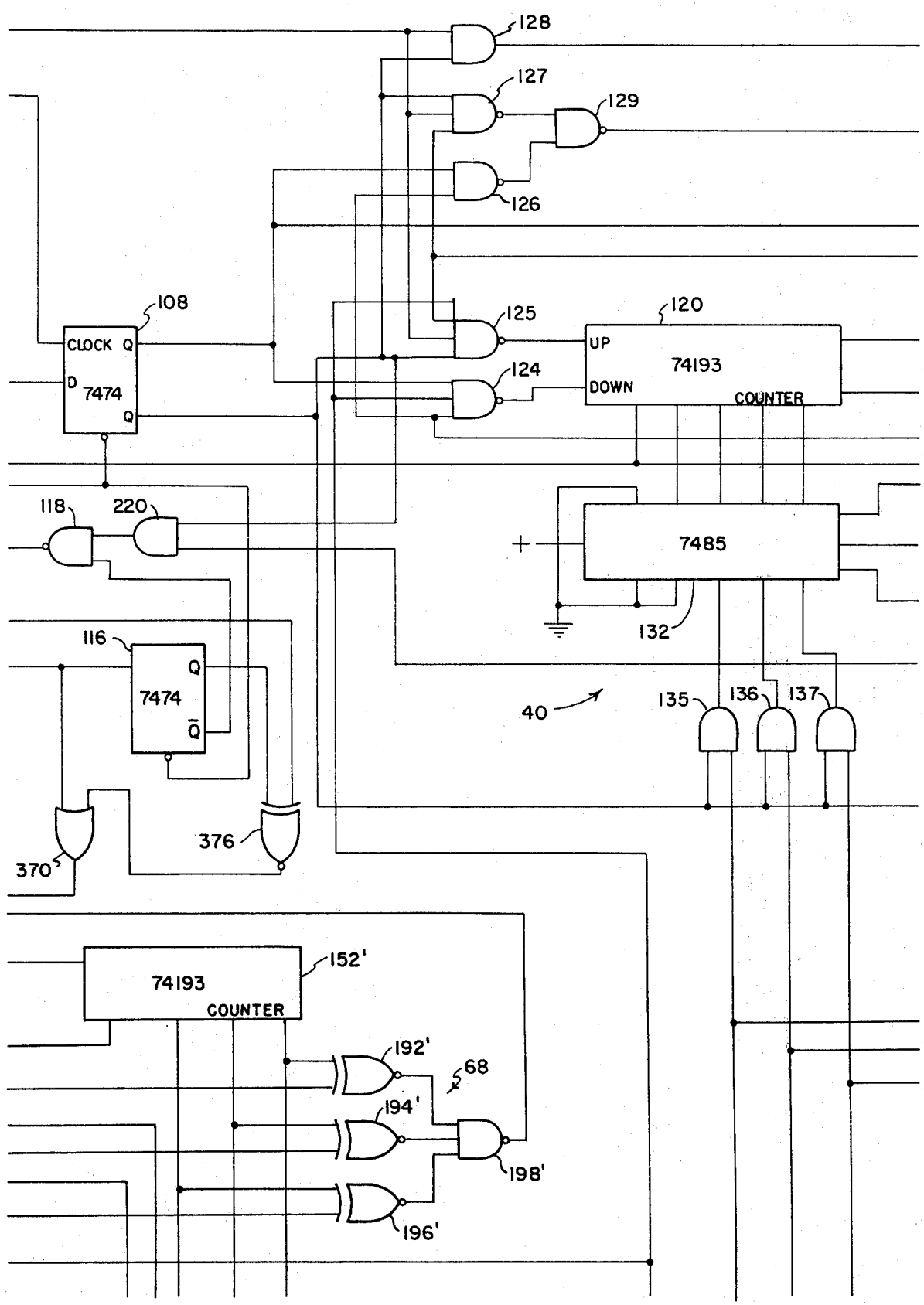
Figure 4:
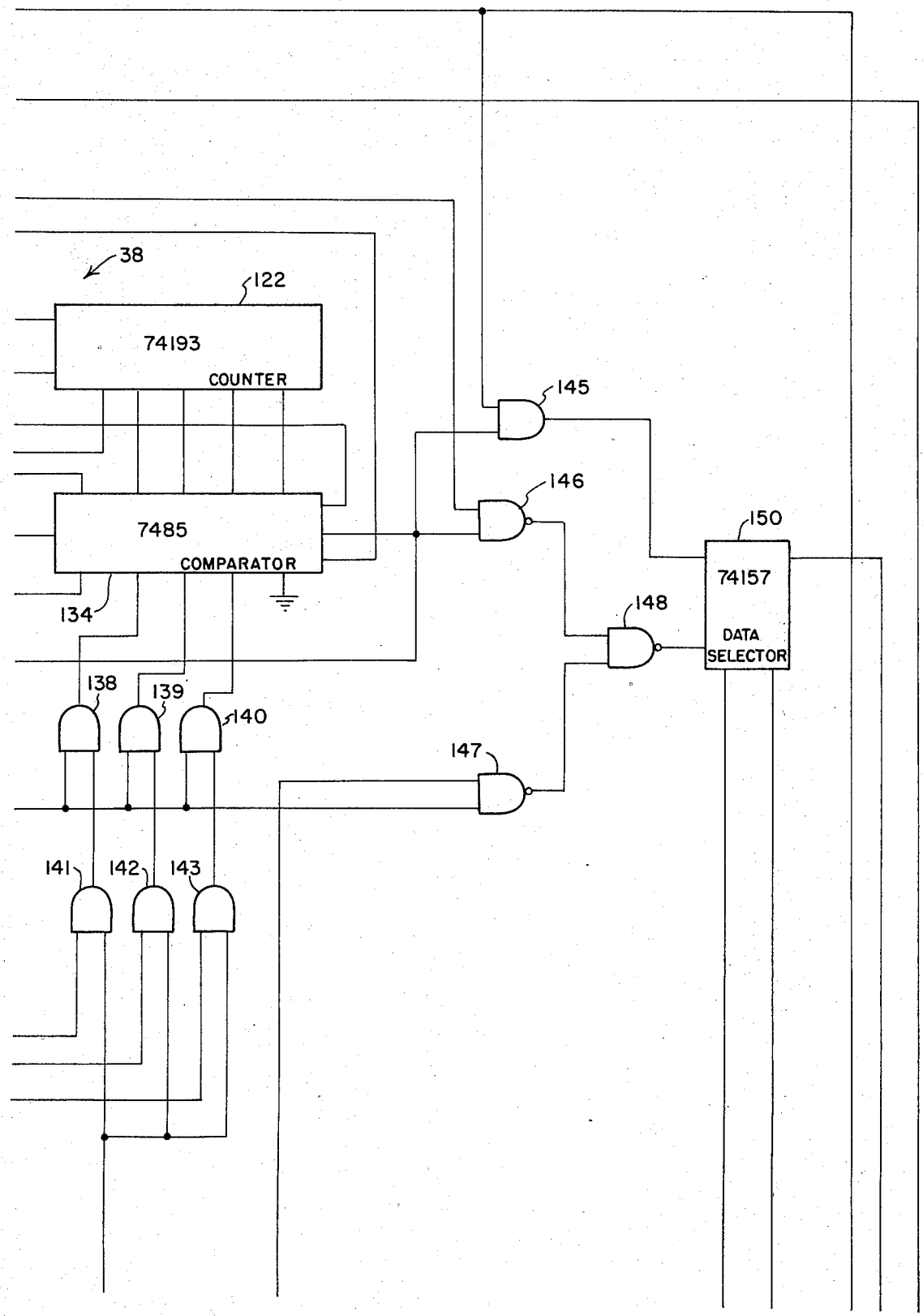
Figure 5:
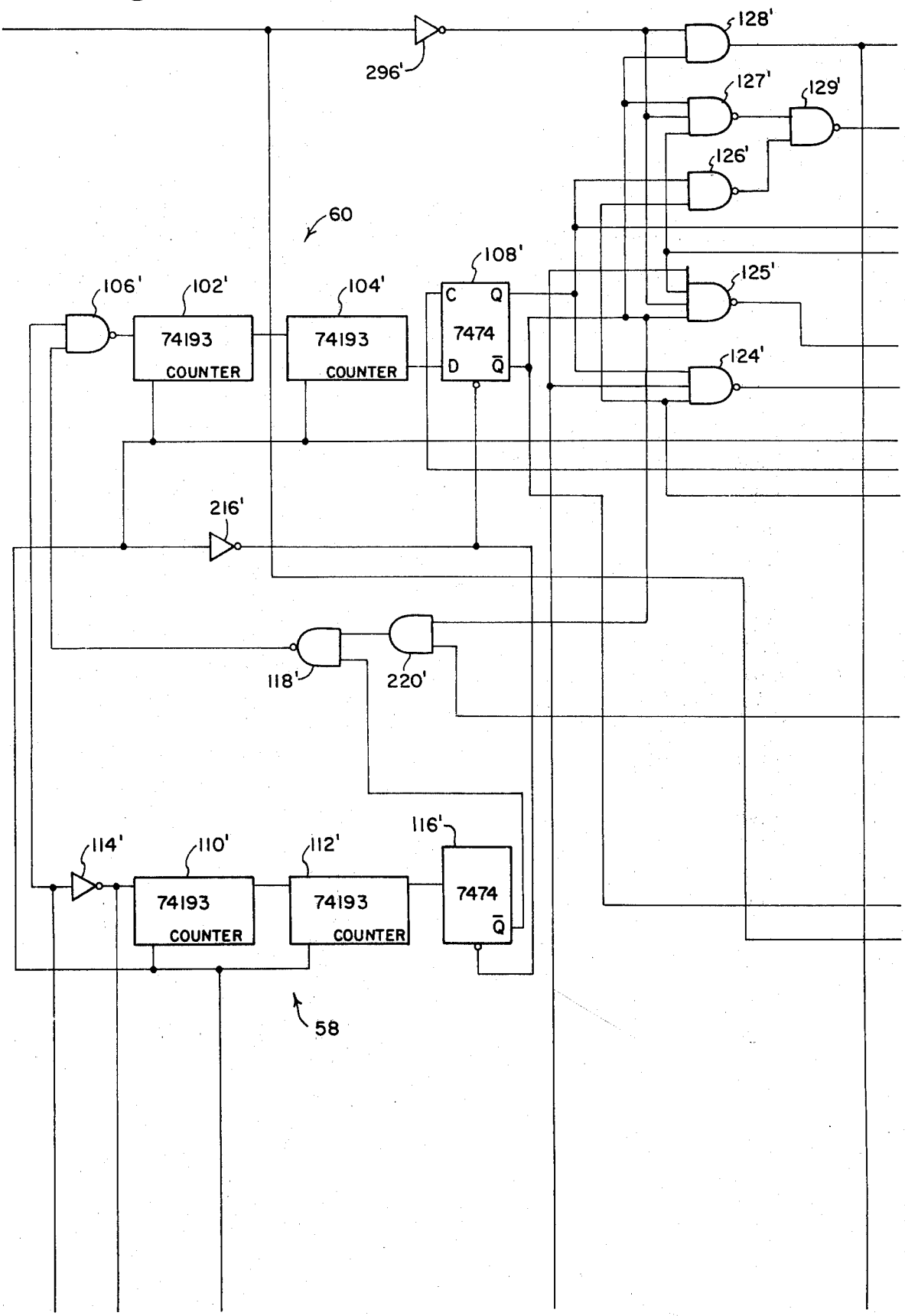
Figure 6:
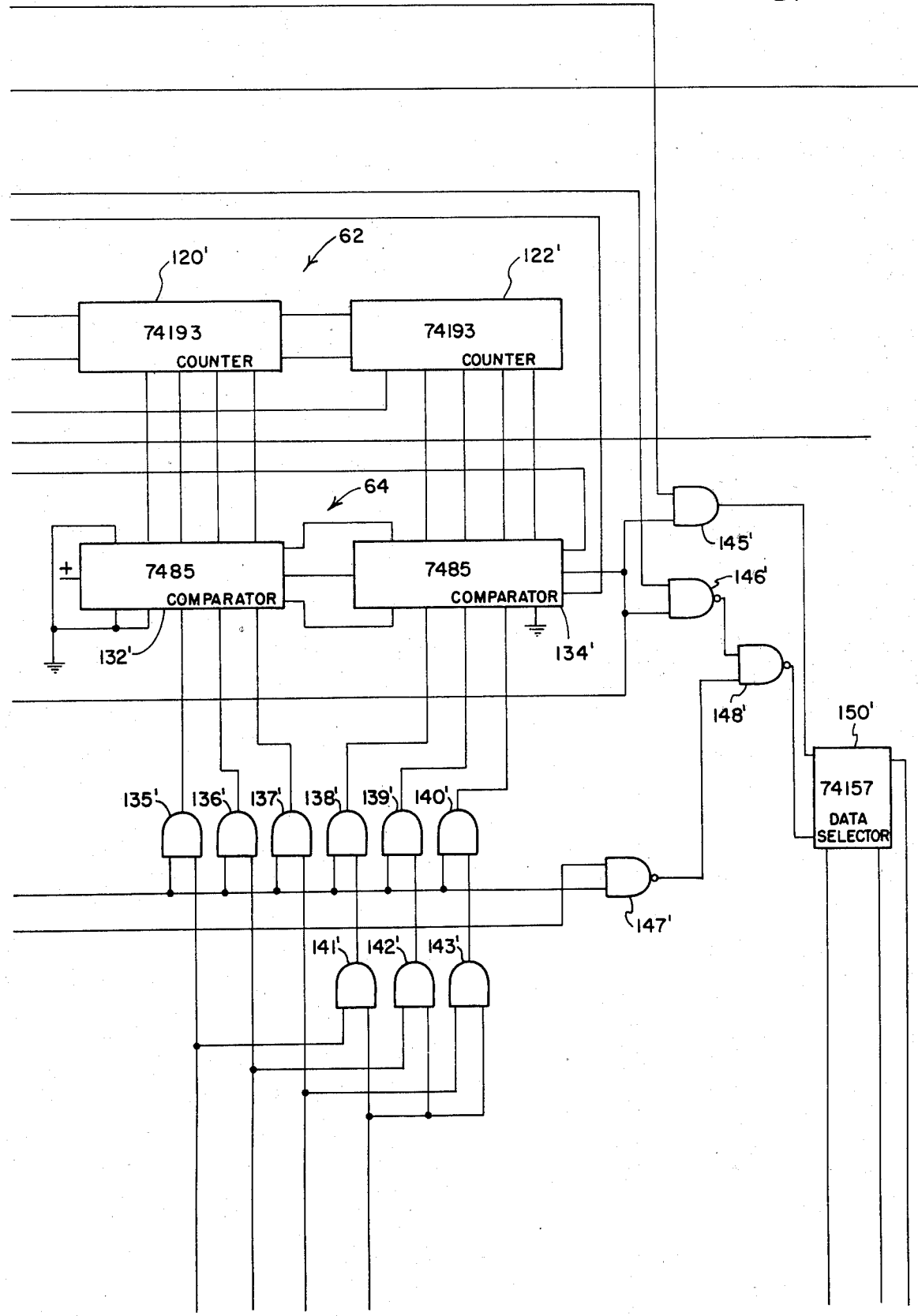
Figure 7:
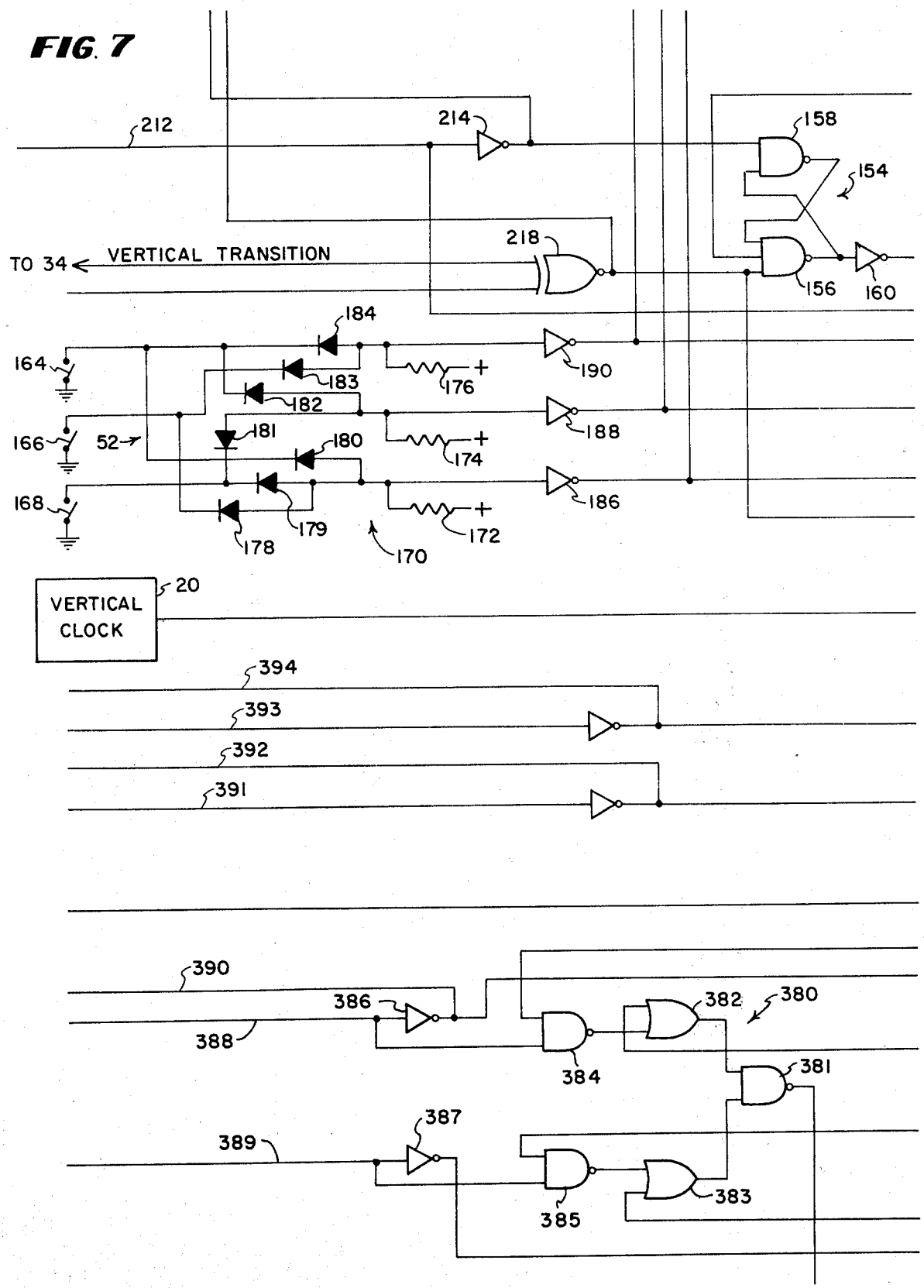
Figure 8:
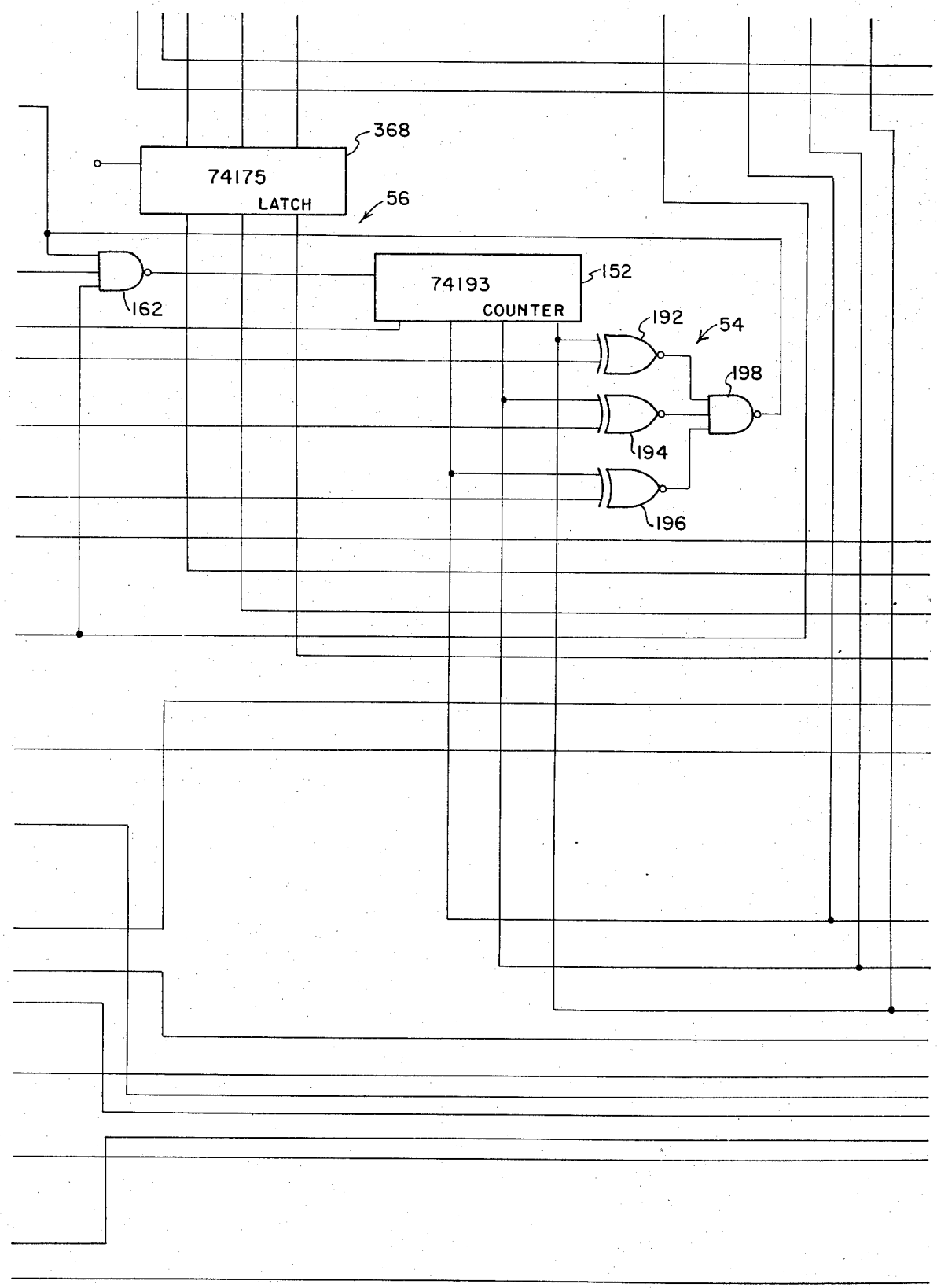
Figure 9:
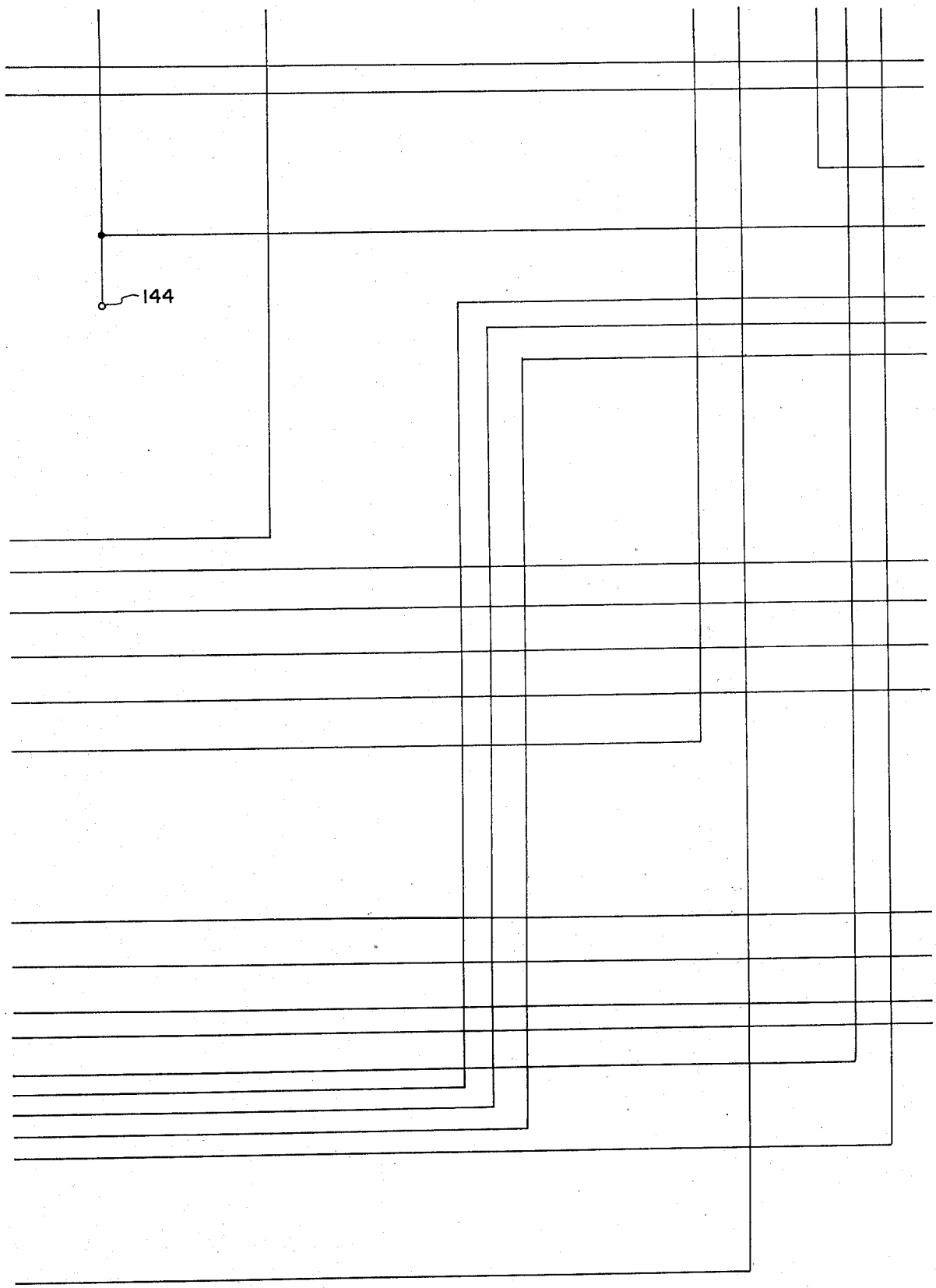
Figure 10:
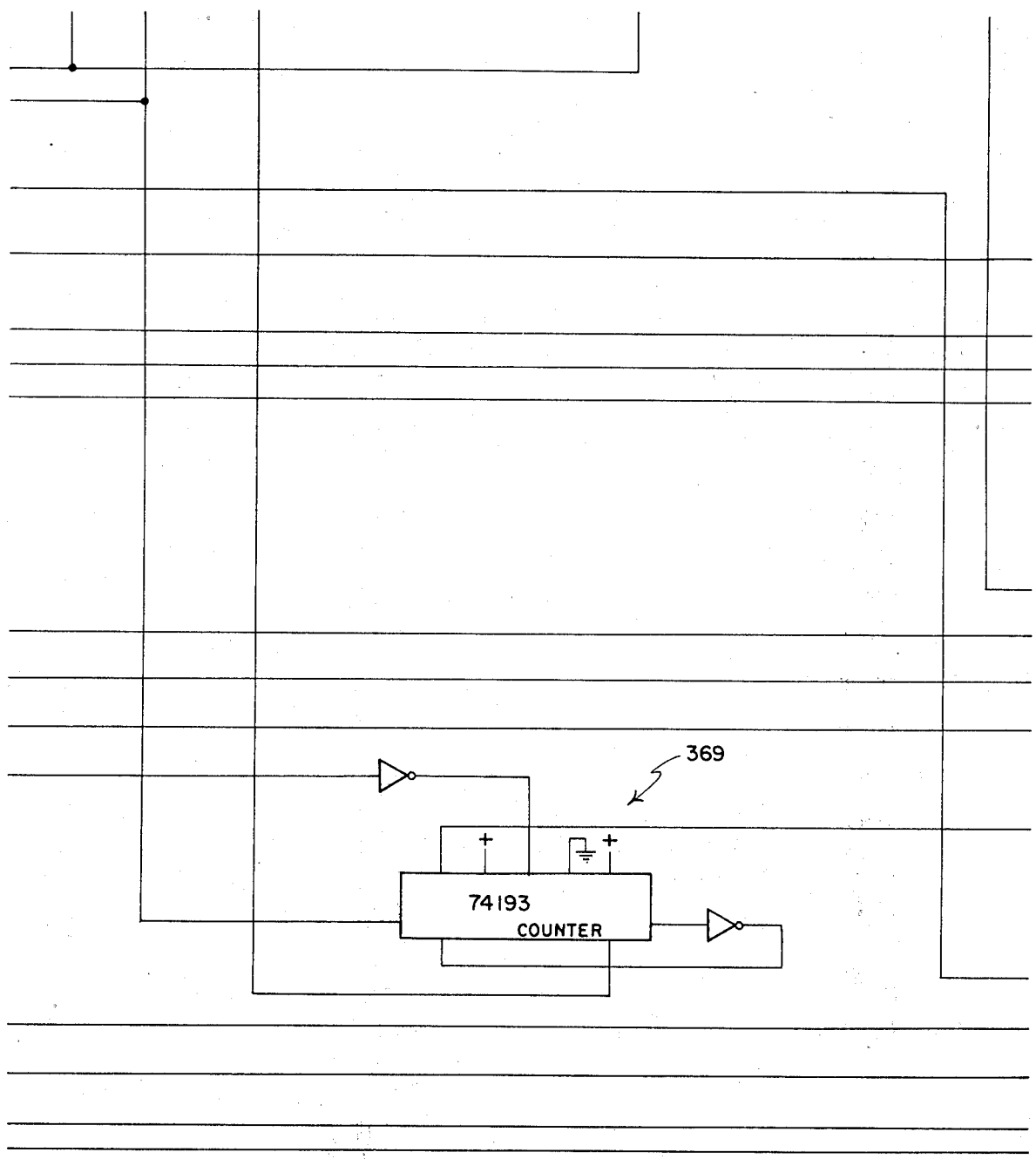

The center of field counter 34 (FIGS. 2 and 3 is similar to the counter 36 and utilizes a pair of 4-bit counters 110 and 112, an inverter 114 and a flip-flop 116. The counter 110 receives pulses from the vertical clock via the inverter 114, and the counter 112 applies an output pulse to the flip-flop 116 to indicate the center of the field when it overflows after 256 pulses have been received. Upon overflow, the $\overline{Q}$ output of the flip-flop 116 goes low to cause a NAND gate 118 to provide an enabling signal to the gate 106 to permit the counter 36 to resume counting during the second half of the field.

The vertical border counter 38 (FIGS. 3 and 4) comprises a pair of 4-bit up/down counters 120 and 122 and a series of gates 124, 125, 126, 127, 128 and 129 which control the operation of the counters 120 and 122. The comparator 40 utilizes a pair of binary comparators 132 and 134, a series of input AND gates 135–143, a series of output gates 145–148 and an output data selector 150. The gates 141–143 are enabled by a high state signal applied to an input point 144 when a soft border effect is selected. This causes signals to be applied to the more significant bit positions of the comparator 134 to increase the border transition time.

The vertical border size counter 56 (FIGS. 7 and 8) comprises a 4-bit counter 152, a latch circuit 154 comprising a pair of NAND gates 156 and 158, an inverting amplifier 160 and a NAND gate 162 for controlling the application of vertical clock pulses to the counter 152.

The border width selector 52 (FIG. 7) comprises three width selector switches 164, 166 and 168, a width selector matrix 170 comprising resistors 172, 174 and 176, diodes 178–184, and inverters 186, 188 and 190 which drive the comparators 54 and 68. The comparator 54 comprises three exclusive-NOR gates 192, 194 and 196, and a 3-input NAND gate 198. The comparator 68 is similar to the comparator 54 and comprises three exclusive-NOR gates 202, 204 and 206, and a 3-input NAND gate 208.

In operation, when a symmetrical soft edge effect is selected, the flip-flop 108 is enabled by a signal applied to a line 210, and the counters 34, 36, 38 and 56 are cleared at the beginning of each field by a vertical synchronizing pulse applied to a line 212. The pulse applied to the line 212 is applied to the counters 34, 36, 38 and 56 either directly or by means of a pair of inverters 214 and 216. The vertical synchronizing pulse also sets the latch 154 so that a high state enabling signal is applied to the gate 162 to permit the gate 162 to pass vertical pulses from the clock 20 to the counter 152. The counter 152 counts the vertical clock pulses until the count in the counter 152 is equal to the count represented by the signal applied to the NOR gates 192, 194 and 196 by the border width selector 52. When this happens, the output of the gate 198 goes low, thereby disabling the gate 162 and terminating the application of further pulses to the counter 152. If a vertical transition signal is generated by the comparators 33 (FIG. 4) and applied to the latch 154 (via an exclusive-NOR gate 218) before the count in the counter 152 reached the value represented by the border width selector 52, the latch 154 is toggled by the output of the gate 218. This disables the gate 162 to terminate the counting of vertical clock pulses by the counter 152 before the count reaches the value selected by the border width selector 52. As a result, the final count in the counter 152 is determined by the value selected by the border width selector 52, or by the number of vertical clock pulses received prior to a vertical transition from the comparators 33, whichever is lower.

In the soft wipe mode of operation, the count from the counter 152 is applied to the 4-bit counters 132 and 134 via the AND gates 135–143. In the hard edge mode, the gates 141–143 are disabled to prevent the application of the count from the counter 152 to the counter 134 to thereby reduce the width of the border. In either case, the outputs of the gates 135–140 are compared with the count in the counters 120 and 122 by the respective comparators 132 and 134 until the count in the counters 120 and 122 is equal to the count represented by the outputs of the gates 135–140. When the counts are equal, the comparator 134 applies a high state signal to an AND gate 220 to thereby cause the gate 118 to disable the gate 106 and to terminate the counting of vertical clock pulses by the vertical memory counter 36 at the completion of the border transition. Simultaneously, a low state signal is applied to the gate 125 to terminate the counting of vertical clock pulses by the vertical border counter 38, and a high state signal is applied to the gate 124 to condition the counter 138 to count in a downward direction when the count is subsequently resumed.

The center of field counter 34 continues to count until the counter 112 overflows at the center of the field and causes the flip-flop 116 to apply a low state signal to the gate 118. The low state signal causes the gate 118 to apply a high state signal to the gate 106 to enable the gate 106 to again pass vertical clock pulses to the vertical memory counter 36. At this point, the vertical memory counter resumes counting until it overflows, at which point it toggles the flip-flop 108 which generates a high state signal at its Q output for enabling the gate 124 to pass pulses to the down counting input of the counter 120. Simultaneously, the $\overline{Q}$ output of the flip-flop 108 disables the gates 135–140 and causes all zeroes to be applied to the comparators 132 and 134 by the gates 135–140. Consequently, the counters 120 and 122 continue to count in the downward direction until a zero count is reached at which point the counter 134 disables the gate 124 to terminate the count. This up/down counting sequence is repeated once every field.

RAMP GENERATORS

The variable slope ramp generators 42 and 66 according to the invention are illustrated in FIGS. 12–15. The vertical ramp generator 42 (FIG. 14) contains a charging current source 230, a discharging current source 232 and a capacitance switching circuit 234. The charging current source 230 contains a charging transistor 236 having its collector connected to the capacitance switching circuit 234 and its emitter connected to a positive source of electrical potential by means of a resistor 238 and a variable resistor 240. Bias for the transistor 236 is provided by a pair of resistors 242 and 244, a diode connected transistor 246 and a switching transistor 248. Similar circuitry is employed in the discharge circuit 232 which utilizes a discharging transistor 250 having a collector coupled to the capacitance switching circuit 234 and an emitter connected to a source of negative potential by means of a resistor 252 and a variable resistance element 254. The variable resistance elements 240 and 254 serve to adjust the charging and discharging currents, and are set at the factory to adjust the slopes of the respective charging and discharging ramps. Bias for the transistor 250 is provided by a pair of resistors 256 and 258 and a diode connected transistor 260.

The capacitance switching circuit includes five timing capacitors 262, 264, 266, 268 and 270 and three switching transistors 272, 274 and 276 which serve selectively to switch various ones of the timing capacitors in circuit with the charging and discharging current sources 230 and 232. In the embodiment illustrated in FIG. 14, all of the timing capacitors 262, 264, 266, 268 and 270 have the same value, and consequently, the ramp generated when the transistor 272 is rendered conductive will have twice the slope of the ramp generated when the transistor 274 is conductive, and the ramp generated when the transistor 276 is rendered conductive will have one-half the slope of the ramp generated when the transistor 274 is rendered conductive. A circuit including a field effect transistor 278 and a capacitor 280, a diode 282 and a pair of resistors 284 and 286 is utilized to discharge all of the timing capacitors during the blanking intervals.

Figures 11, 11A:
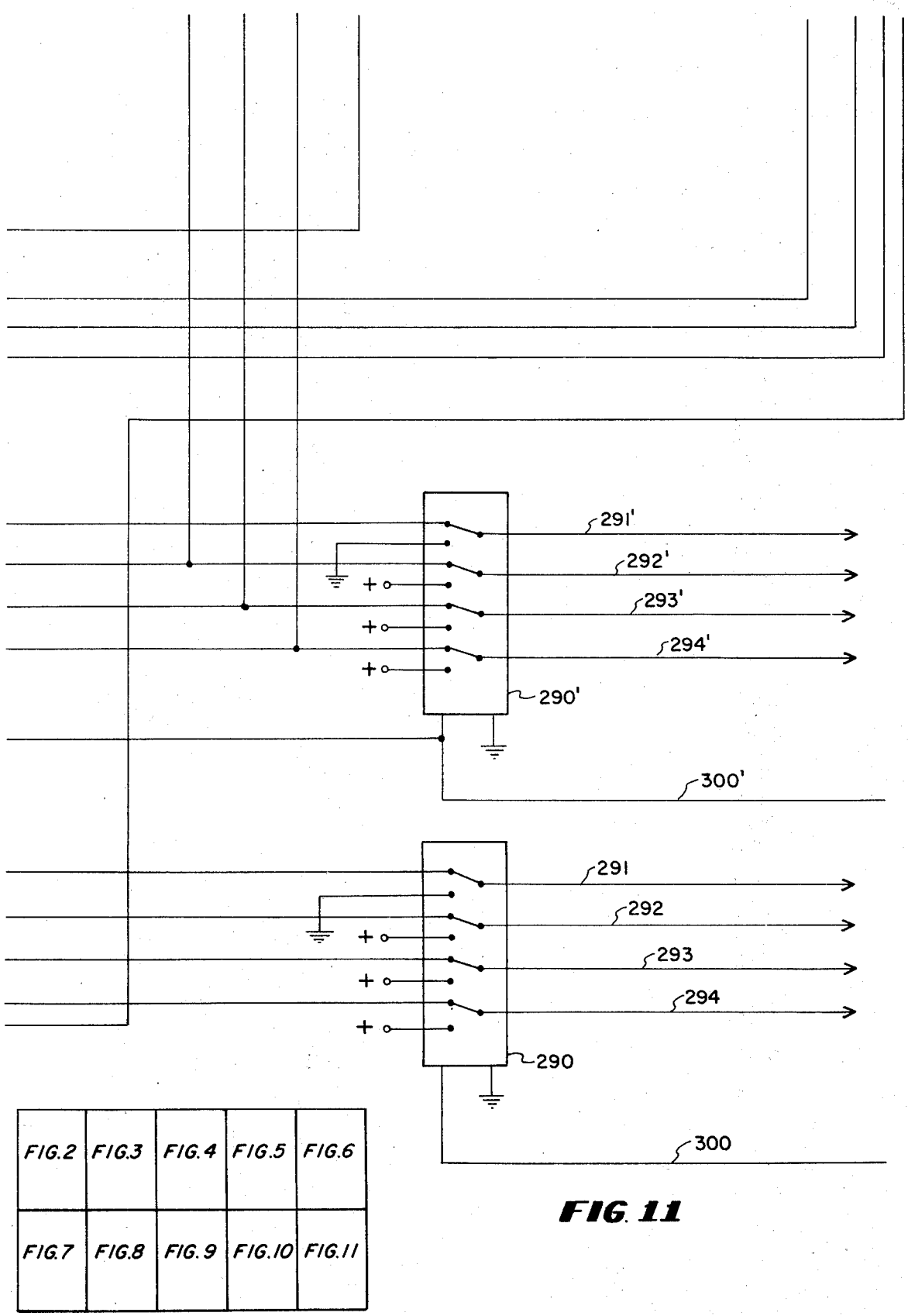
FIG. 11A illustrates how
Figure 12:
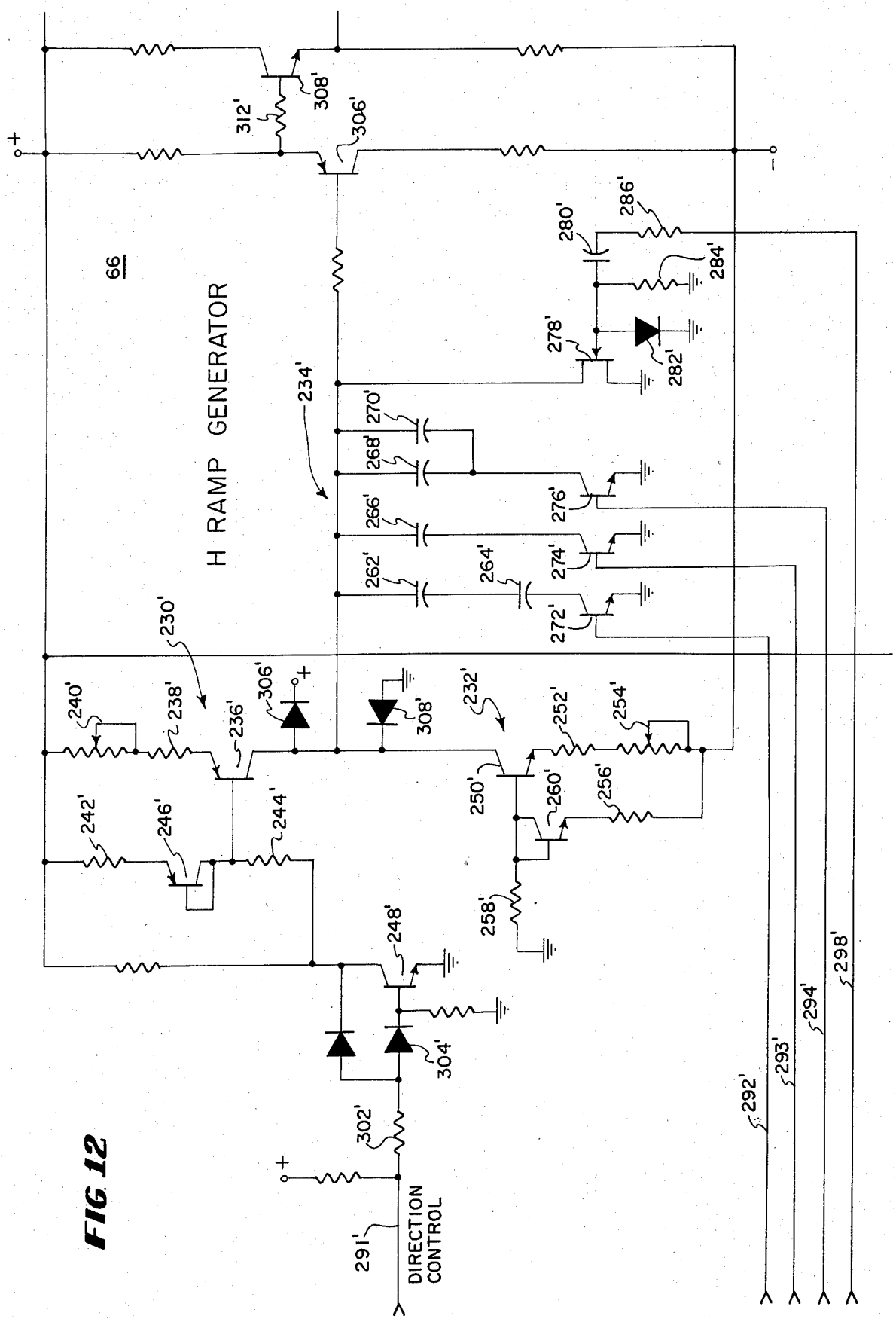

The slope of the ramp generated by the vertical ramp generator 42 is controlled by the output of the vertical border size counter 152 which is applied to the transistors 272, 274 and 276 via a data selector 290 (FIG. 11). The data selector 290 in this embodiment is equivalent to a 4-pole double throw switch that selectively connects four of eight input lines to four output lines. The data selector 290 is depicted for purposes of illustration as four double throw switches each having an armature connected to one of the output lines and a pair of contacts connected to a pair of input lines.

Figure 14:
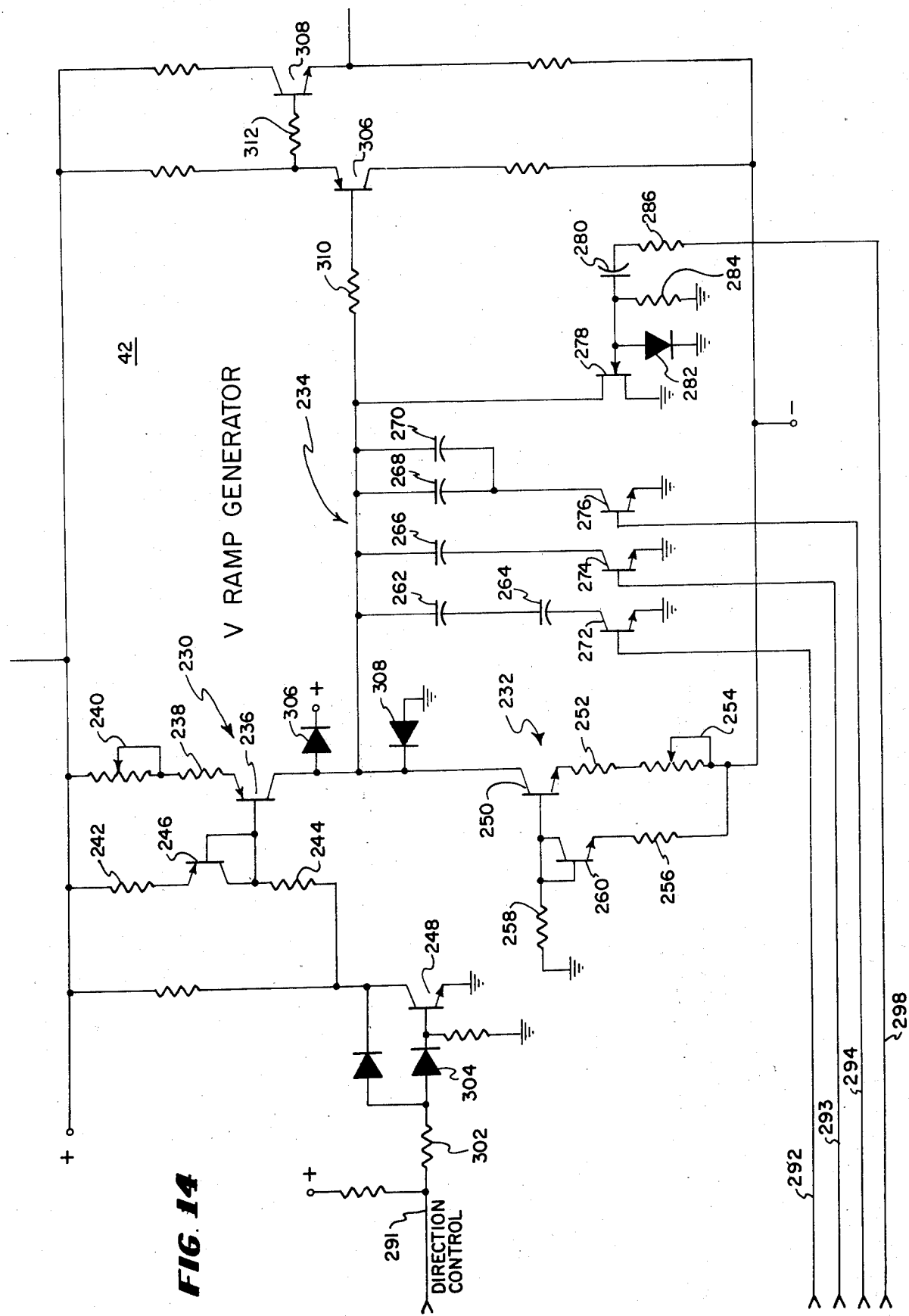
Figure 15:
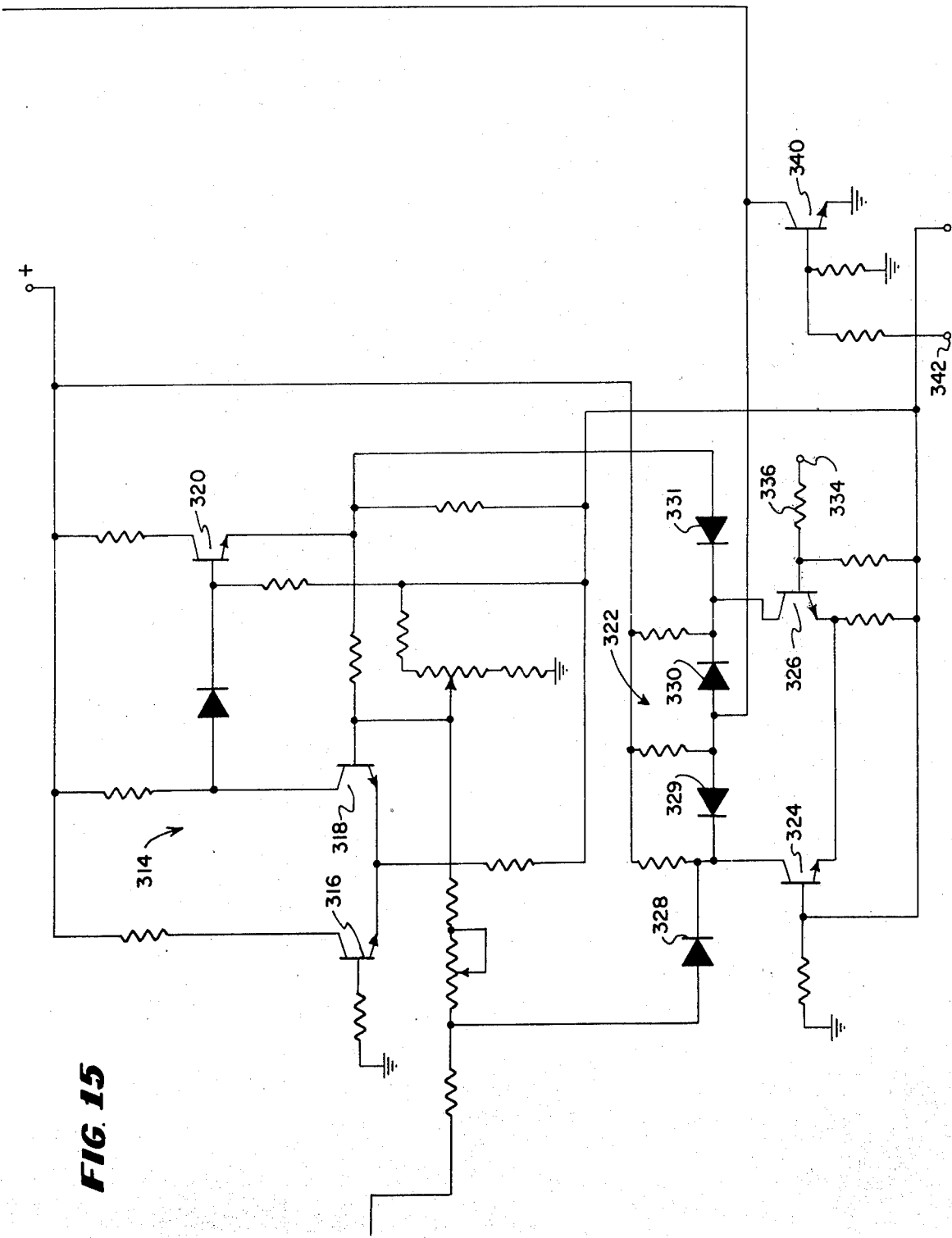

The four output lnes 291–294 of the data selector 290 (FIG. 11) are connected to the respective lines 291–294 of the vertical ramp generator 42 (FIG. 14). During the scanning interval, the output line 291 is connected to the output of the gate 128 and the output lines 292–294 are connected to the outputs of the counter 152 in the vertical border size counter 54 by the data selector 290. As a result, the transistor 248 in the ramp generator 42 is controlled by the output of the gate 128. The output from the gate 128 is in turn controlled by the vertical transition signal received from the comparators 33 via the gate 218 and an inverter 296, and by the output of the flip-flop 108. The transistors 272, 274 and 276 are controlled by the outputs of the vertical border size counter 152.

In operation, at the beginning of the horizontal field, a vertical blanking pulse is applied to the field effect transistor 278 via a line 298 and to the data selector 290 via a line 300. The blanking pulse temporarily renders the field effect transistor 278 conductive, and renders the data selector 290 operative to connect the output line 291 to ground and the output lines 292–294 to a source of positive potential. In this state, the positive charging source 230 is disabled, and the transistors 272, 274 and 276 are rendered conductive to permit all of the timing capacitors 262, 264, 266, 268 and 270 to be completely discharged. Following the termination of the vertical blanking pulse, the field effect transistor 278 is rendered nonconductive, the line 291 is connected to the output of the inverter 296 (via the data selector 290 and the gate 128), and the output lines 292–294 are again connected to the outputs of the counter 152. During the initial portion of the vertical scan, the transition signal applied to the output line 291 by the inverter 296 is low, thereby maintaining the transistor 248 nonconductive and preventing the charging of any of the timing capacitors in the capacitance switching circuit 234. The counter 152 continues to count until a vertical transition signal occurs or until the count reaches the value determined by the border width selector circuit 52. The final count in the counter 152 is then applied to the transistors 272, 274 and 276 to energize one (or more) of the transistors 272, 274 and 276 to provide a ramp having a slope proportional to the count in the counter 152. For example, if the border width had been selected by closing the switch 164, a one would be applied to the NOR gate 192, thereby causing the counter 152 to count until a one was provided at the output of the counter 152 connected to the NOR gate 192. This would result in a one being applied to the output line 294 of the data selector 290 and would cause the transistor 276 to be rendered conductive. Similarly, closing the switch 168 would cause the transistor 272 to be rendered conductive. If the vertical transition had occurred before the counter 152 had reached a count corresponding to the count indicated by the border width selector circuit 52, then the ones of the transistors 272, 274 and 276 coupled to the outputs of the counter 152 that had a high state signal would be rendered conductive.

Once the slope of the ramp provided by the ramp generator 12 has been selected by energizing an appropriate one of the transistors 272, 274 and 276, a positive going ramp is initiated by the vertical transition signal applied to the line 291 by the data selector 290. The transition signal applied to the line 291 is applied to the transistor 248 by means of a resistor 302 and a diode 304. This renders the transistor 248 conductive and renders the transistor 236 operative to provide current to whichever ones of the timing capacitors 262, 264, 266, 268 and 270 are connected to ground by the conductive ones of the transistors 272, 274 and 276. Because the transistor 230 provides a constant current to the charging capacitors, the voltage at the junction of the collector of the transistor 236 and the timing capacitors increases linearly as long as the transistor 236 is conductive. The linear increase in voltage continues until the amplitude of the voltage is sufficient to forward bias a diode 306 which is connected to a source of positive reference potential. At this point, the voltage at the junction of the collector of the transistor 236 and the timing capacitors is clamped to one diode drop below the reference potential.

The time required for the ramp to reach a sufficient amplitude to forward bias the diode 306 determines the width of the transition border. Once the transition has been completed, the voltage at the junction of the collector of the transistor 236 and the timing capacitor remains clamped at one diode drop below the positive reference potential until the transistor 248 is again rendered nonconductive by the overflow of the counter 104 in the vertical memory counter 36 which toggles the flip-flop 108 to cause the output of the gate 128 to go low. When this occurs, the timing capacitors are discharged by the negative potential source through the resistors 252 and 254 and the discharging current source transistor 250 until the voltage at the junction of the collector of the transistor 250 and the timing capacitors reaches a potential sufficient to forward bias a diode 308. At this point, the junction of the collector of the transistor 250 and the timing capacitors are clamped to a value equal to one diode drop below ground for the remainder of the vertical scan. This action completes the second border transition, and the cycle is repeated following the next vertical blanking pulse.

EFFECTS SELECTION AND SIGNAL MIXING

The ramp voltage generated at the junction of the collectors of the transistors 236 and 250 and the timing capacitors is applied to a buffer amplifier comprising a pair of complementary symmetry emitter-follower transistors 306 and 308 by means of a pair of resistors 310 and 312. The output of the emitter follower transistor 308 is coupled to the input of an inverting amplifier 314 comprising transistors 316, 318 and 320 which provides an inverted replica of the ramp signal from the transistor 308 at the emitter of the transistor 320. The inverted and uninverted ramp signals from the respective transistors 320 and 308 are applied to an electronic single pole double throw diode switch 322 comprising a pair of transistors 324 and 326 and four diodes 328–331. The switch 322 permits one of the signals from the transistors 308 and 320 to be selected and applied to the nonadditive mixer 44 to achieve various special effects. Inversion is accomplished by applying a positive potential to an input point 334. This positive potential is applied to the base of the transistor 326 by means of a resistor 336 and through the base-emitter junction of the transistor 326 to the emitter of the transistor 324. This renders the transistor 326 conductive and the transistor 324 nonconductive thereby rendering the diodes 328 and 329 nonconductive and the diodes 330 and 331 conductive to pass the inverted ramp signal to the nonadditive mixer 44. Applying a zero or a negative potential to the input point 334 renders the transistor 326 nonconductive and the transistor 324 conductive, thereby reverse biasing the diodes 330 and 331 and forward biasing the diodes 328 and 329 to apply the noninverted ramp signal from the transistor 308 to the nonadditive mixer 44. A transistor 340 serves to shunt the vertical ramp signal to ground when it is rendered conductive by applying a positive potential to an input point 342. In this manner, the vertical ramp circuit may be disabled if only horizontal effects are desired.

The nonadditive mixer 44 comprises a pair of transistors 350 and 352 having their emitters connected to a common emitter resistor 354 and their collectors connected to a common collector resistor 356. Signals from the respective vertical and horizontal ramp generators 42 and 66 are applied to the bases of the transistors 352 and 350 via a pair of resistors 358 and 360 and the switches 322 and 322'.

The nonadditive mixer 44 serves to couple one of the signals applied to the bases of the transistors 350 and 352 to the emitter resistor 354. For example, if the amplitude of the ramp signal applied to the transistor 352 is larger than the ramp signal applied to the transistor 350, the base-to-emitter junction of the transistor 352 will be rendered conductive, and the transistor 352 will operate as an emitter follower to transfer the signal applied to the resistor 358 to the resistor 354. In addition, since the voltage appearing at the emitter of the transistor 352 will be substantially equal to the voltage applied to its base, and since the amplitude of this voltage is larger (in this example) than the voltage applied to the base of the transistor 350, the base-to-emitter junction of the transistor 350 will be reverse biased and the transistor 350 rendered nonconductive. Consequently, only the signal applied to the transistor 352 will be applied to the resistor 354. In a similar fashion, if the voltage applied to the transistor 350 is larger than the voltage applied to the transistor 352, the transistor 350 will operate as an emitter follower and the transistor 352 will be rendered nonconductive. Consequently, the nonadditive mixer 44 permits a convenient way to transfer control of the video switch between the horizontal and vertical ramp signals to provide a clean intersection of the horizontal and vertical borders when an effect utilizing both horizontal and vertical borders is employed.

The outputs of the transistors 350 and 352 are coupled to the video switch 18 (FIG. 1) by means of a resistor 362 and an emitter follower comprising a transistor 364 and a resistor 366. The emitter follower serves to isolate the output of the transistor 350 and 352 from the video switch and provides improved drive to the video switch. Additional ramp inverting circuitry and logic circuitry for providing an abrupt or "hard" transition (block 45 of FIG. 1) is normally interposed between the output of the transistor 364 and the video switch 18. Such circuitry is generally employed to increase the flexibility of the special effects generator; however, for purposes of clarity, a detailed discussion of such circuitry will be omitted.

HORIZONTAL COUNTING CIRCUITRY

The operation of the center of line counter 58, the horizontal memory counter 60, the horizontal border counter 62, the comparator 64, the horizontal border size counter 70 and the horizontal ramp generator 66 is essentially the same as the operation of the respective center of field counter 34, the vertical memory counter 36, the vertical border counter 38, the comparator 40, the vertical border size counter 56, and the vertical ramp generator 42, described in the foregoing. Accordingly, analogous components of the respective horizontal and vertical system are designated by like numbers, with the components in the horizontal system being designated by primed numbers. The main difference between the horizontal and vertical systems is the higher speed of operation of the horizontal system, and the addition of a vertical interval latch 368 between the output of the horizontal border size counter 152 and the data selector 290'. This permits the data applied to the data selector 290' to be changed only once per field, thereby providing a more stable border. In addition, a horizontal drive pulse shaping circuit 369 is used to control the center of line counter 58 to provide a more precise indication of the center of the line.

Under normal circumstances, the counting by the horizontal border counter 152' is initiated at the beginning of the center scanning line of the field. This is accomplished by applying a high state signal to the gate 158' of the latch 154' (FIG. 2) from the output of the counter 112 in the center of field counter 34 via an OR gate 370. The output of the OR gate 370 is also applied to the horizontal border size counter 152' via an inverter 372 in order to clear the counter 152' at the beginning of the center scanning line. However, under certain circumstances such as the case where diamond or a circle pattern effect has been selected, it is desirable to determine the size of the border by initiating the operation of the horizontal border size counter at the end, rather than the center of the field. This is accomplished by applying a low level signal to an input line 374 to thereby cause an exclusive-NOR gate 376 to operate as an inverter. Under these circumstances, one of the inputs to the gate 370 will always be high, because when the output of the counter 112 goes low, the Q output of the flip-flop 116 will be inverted by the gate 376 to provide a high level signal to the gate 370. Consequently, the signal applied by the gate 370 to the input of the gate 158' will always be high, and the latch 154' will only be toggled by the horizontal transition signal from the comparators 33. The counting of pulses by the horizontal border size counter 152' is initiated once per line by a high level signal applied to the input of a gate 378 by the pulse shaper 369.

Various special effects may be generated by a combining circuit 380 comprising gates 381–385 and inverters 386 and 387. The circuit serves to combine the horizontal and vertical border signals under the control of signals applied to a pair of input lines 388 and 389 to provide effects having various combinations of hard or soft borders and vertical and horizontal borders. A combined horizontal and vertical signal is provided at the output of the gate 381 and may be used to provide other special effects. Signals applied to input lines 390–394 control data selectors 150 and 150' and the pulse generating circuit 369 to provide other special effects. In this respect, the circuit 380 serves the same function as the effects selector 45 of FIG. 1; however, such special effects will not be discussed in detail since they are outside the scope of the present invention.

AN ALTERNATIVE EMBODIMENT

FIGS. 16–21 show an alternative embodiment of the transition circuit according to the invention. The principal differences between the circuit illustrated in FIGS. 16–21 and the previously described embodiment is the use of a digital comparator rather than the use of a nonadditive mixer to provide the switching at the intersection of the horizontal and vertical borders, and the use of logic circuitry for reducing the width of both the horizontal and vertical borders if either the horizontal or vertical edge of the screen is approached, as opposed to the control of the border widths previously described.

The circuitry is simplified by utilizing exclusive-NOR gates to convert the horizontal and vertical transitions to pulses for controlling the soft edge transition circuit. The latter feature eliminates the need for providing both positive and negative going transitions to various portions of the circuit. In other respects, the operation of the embodiment illustrated in FIGS. 16–21 is similar to the operation of the embodiment previously described.

A border width control circuit 400 (analogous to the border width control circuit 14 of FIG. 1) comprises a horizontal border counter 402, a comparator 406, three border width selector switches 408, 410 and 412, a data selector 414 and a latch 416. Horizontal drive pulses (designated as H/D), which occur at the beginning of each scanning line, are applied to the counter 402 via a monostable multivibrator 418 and a NAND gate 420. The operation of the NAND gate 420 is controlled by a latch 423 comprising a pair of NAND gates 422 and 424. The latch 423 is in turn controlled by a horizontal transition pulse generated from the horizontal transition (H PATT) by a pulse forming circuit 426 comprising a NOR gate 428, a capacitor 430 and a pair of inverters 432 and 434, and by a center of field indicative signal (V/UP) applied to the latch 423 by means of a monostable multivibrator 436. The operation of the border width control circuit 400 is as follows. The nominal border width is selected by closing the appropriate ones of the switches 408, 410 and 412. The signal generated by the closed ones of the switches 408, 410 and 412 is compared with the count in the counter 402 by the comparator 406. Horizontal drive pulses (H/D) are applied to the monostable multivibrator 418 via a line 438 and synchronized to the horizontal clock pulses (H CLOCK) that are applied to line 440. The monostable multivibrator 418 provides synchronized and shaped horizontal clock pulses which are counted by the counter 402 whenever the gate 420 is enabled by the latch 423. The latch 423 enables the gate 420 when a transition (V/UP) indicative of the center of the field is applied to an input 442 of the monostable multivibrator 436. This permits the counter 402 to count horizontal clock pulses during the center line of the field, beginning at the start of the center line and continuing until a horizontal transition occurs or the counter 402 overflows. If no horizontal transition occurs before the counter 402 overflows, the output of the counter 402 is inverted by an inverter 444 and applied to the latch 423 to terminate the counting process. If the transition occurs before the counter 402 overflows, indicating that the border is to be placed near the edge of the viewing screen, a horizontal transition signal (H PATT) is applied to an input 446 of the circuit 426. The circuit 426 responds to the horizontal transition by generating a pulse to disable the gate 424, thereby toggling the latch 423 and terminating the counting sequence prior to the overflow of the counter 402.

The comparator 406 compares the values of the signals represented by the output of the counter 402 and the switches 408, 410 and 412 and provides a signal to the data selector 414 to cause the data selector 414 to select the one of the signals provided by the counter 402 and the switches 408, 410 and 412 having the smaller value. This signal is transferred to the latch 416 once per field by a vertical drive pulse (V/D) applied to an input 448. Hence, the signal stored in the latch 416 is updated once per field, and represents the narrower of the selected border width or the distance between the vertical edge of the screen and the beginning of the transition border.

The output of the latch 416 is further compared with the distance between a horizontal edge (top or bottom) of the screen to provide an output representative of the smaller of the distances between the transition and the top or bottom of the screen and the contents of the latch 416. This is accomplished by a second comparator circuit 450 comprising a comparator 452 that compares the contents of the latch 416 with the contents of a counter 454. The counter 454 counts the horizontal drive pulses (H/D) that occur once per line and are applied to an input 456. A gate 458 is selectively enabled to pass the horizontal drive pulses by means of a latch 460 comprising a pair of NAND gates 462 and 464. The latch 460 is controlled by a pulse circuit 463 analogous to the circuit 426 comprising an exlusive-NOR gate 465, a capacitor 466 and a pair of inverters 468 and 470. The circuit 463 generates a pulse for toggling the latch 460 upon receipt of each vertical transition (V PATT) at an input line 472. In addition, the latch 460 is toggled by vertical drive pulses (V/D) received at an input line 474 and applied to the latch 460 via a pair of monostable multivibrators 476 and 478. Consequently, the counter 454 counts horizontal drive pulses following the receipt of each vertical drive pulse, and continues to count until the receipt of a vertical transition at the input 472 or until the counter 454 overflows, at which time the latch 460 is toggled by an overflow signal received from an inverter 480.

The comparator 452 compares the contents of the latch 416 and the contents of the counter 454, and operates a data selector 482 to cause the smaller of the counts from the latch 416 and the counter 454 to be selected and applied to a latch 484 which is controlled by vertical drive pulses applied to an input 486 of the latch 484. Consequently, the output of the latch 484 is a signal (updated once per field) representative of the smallest of the counts represented by the switches 408, 410 and 412, the counter 402 and the counter 454.

The circuit illustrated in FIGS. 16–21 also includes a horizontal memory counter circuit 490 (FIG. 16) and a vertical memory counter circuit 492 (FIG. 19) analogous to the vertical and horizontal memory counters 36 and 60 illustrated in FIGS. 1–11. The horizontal memory counter 490 comprises a pair of counters 494 and 496 that are cleared once per line by horizontal drive pulses applied to an inverter 498. The counters 494 and 496 count horizontal clock pulses received via a NAND gate 500 that is controlled by a latch 502. The latch 502 enables the gate 500 at the beginning of each scanning line, disables the gate 500 at the end of the transition border, reenables the gate 500 at the center of each scanning line, and again disables the gate 500 at the beginning of the second transition border. This operation is the same as that previously described in conjunction with the description of the horizontal memory counter 60. When a nonsymmetrical effect is desired, the gate 500 is disabled by a low level (NON/SYM) signal applied to its input 501.

The structure and operation of the vertical memory counter 492 is similar to that of the horizontal memory counter 490. The vertical memory counter 492 comprises a pair of counters 494' and 496' which are controlled by an inverter 498', a NAND gate 500' and a latch 502'. The operation of the vertical memory counter 492 is similar to that of the vertical memory counter 36. The counter 492 begins to count at the beginning of each field, continues counting until the completion of the transition border, whereupon the counting is suspended, resumes counting at the center of the field and terminates counting at the beginning of the second transition border.

Figure 16:
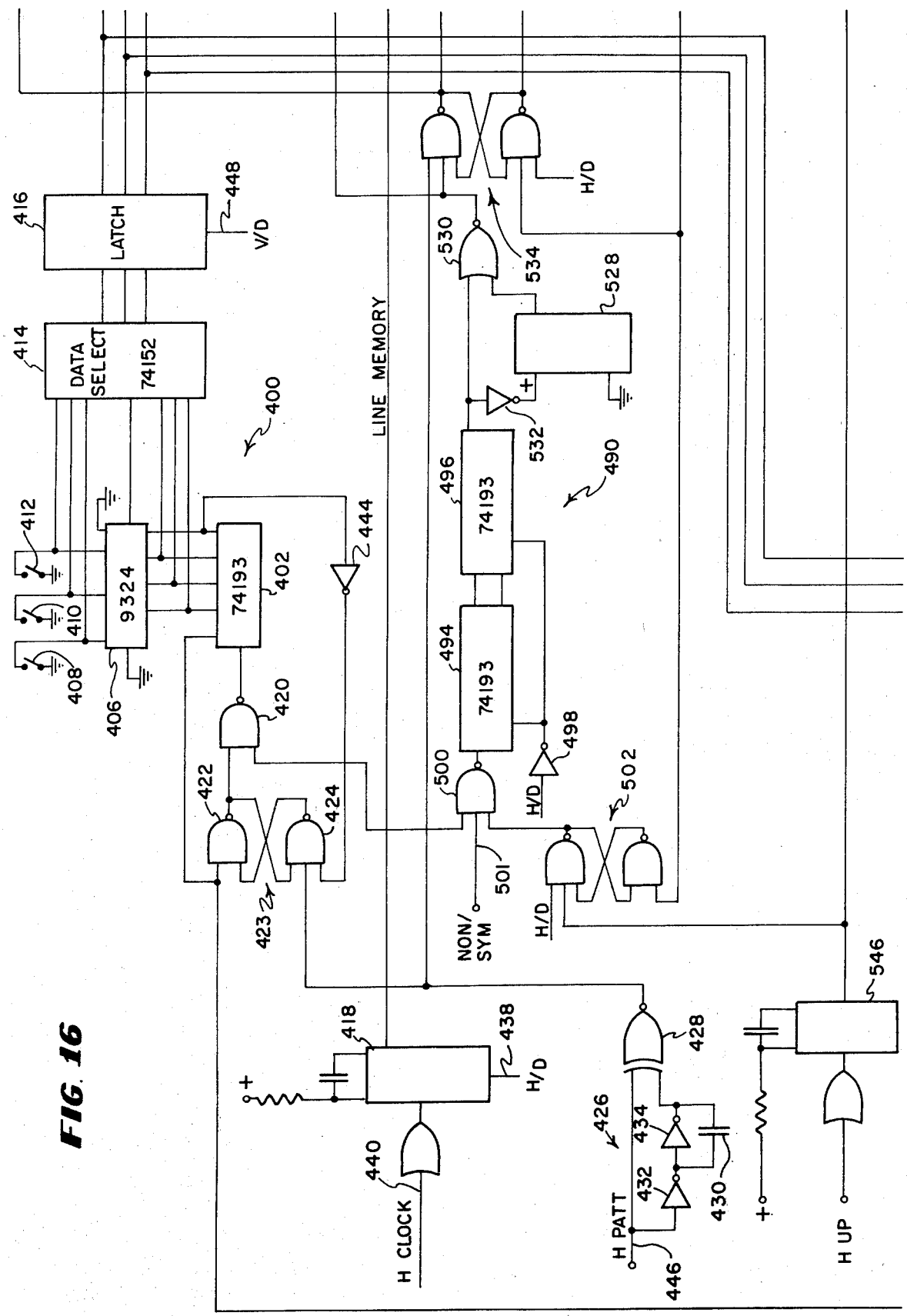
Figure 17:
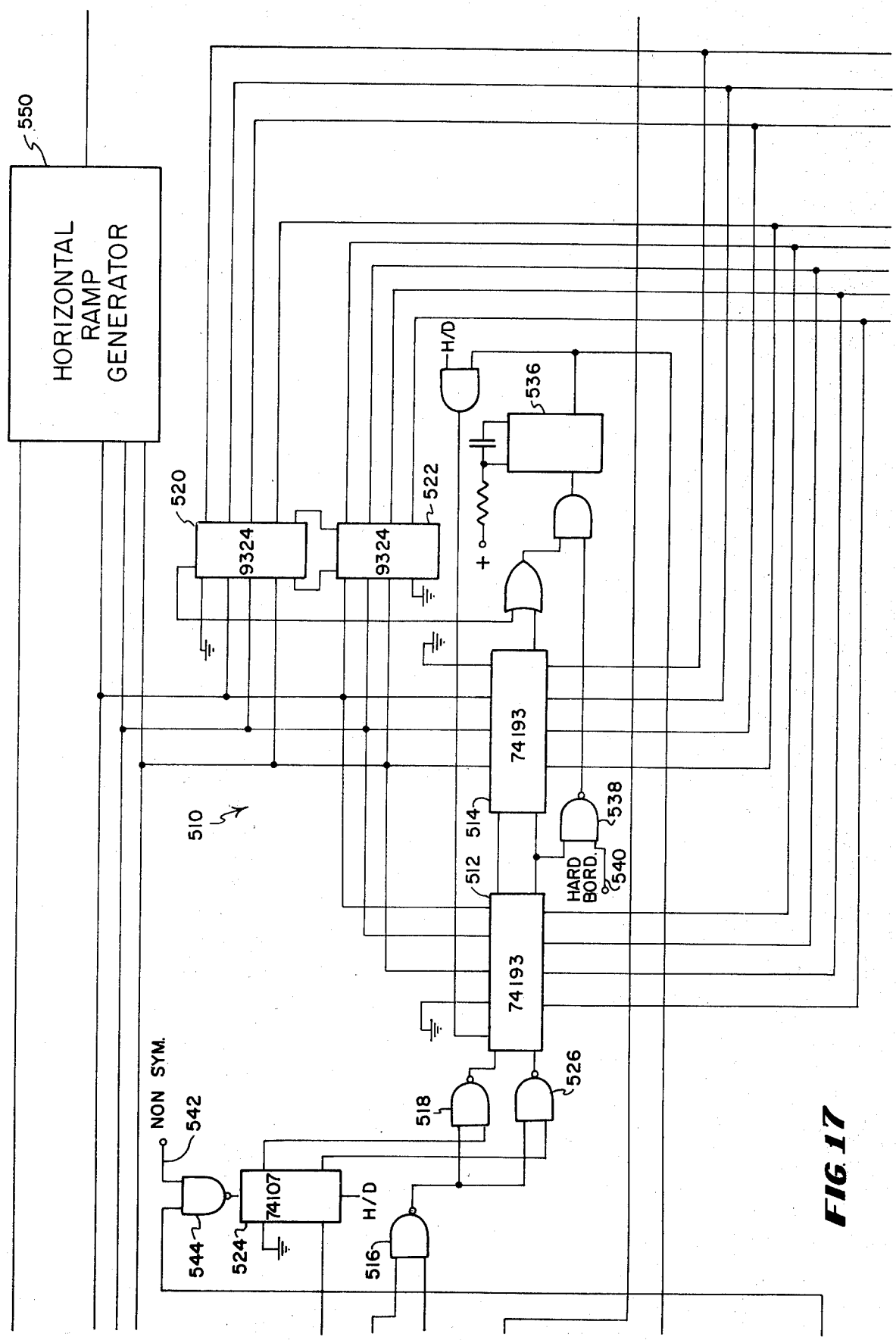

The circuit illustrated in FIGS. 16–21 also includes a horizontal border counter circuit 510 (FIG. 17) comprising a pair of up/down counters 512 and 514. During the first transition border, the counter circuit 510 counts clock pulses applied to its up counting input via a pair of NAND gates 516 and 518. The count in the counter circuit 510 is compared with the output of the latch 416 by a pair of comparators 520 and 522. The direction of the count is controlled by a bistable multivibrator 524 which enables either the gate 518 or a gate 526 connected to the down counting input of the counter 512. The bistable multivibrator 524 is controlled by the output of the counter 496 which is shaped by a shaping circuit comprising a bistable multivibrator 528, a NOR gate 530 and an inverter 532 (FIG. 16). The bistable multivibrator 524 serves to enable one of the gates 518 and 526 to permit the counter circuit 510 to count in either the up or the down direction; the up count occurring during the first transition border, and the down count occurring during the second transition border, as in the soft edge system previously described.

During the up counting portion of the sequence, the counter 510 counts until a count equal to the count in the latch 416 is reached, at which time the latch 502 (FIG. 16) and a latch 534 is toggled by a monostable multivibrator 536 connected to the output of the counter 514. This terminates the up counting sequence following the first transition border. After the horizontal memory counter circuit 490 overflows, the latch 534 is again toggled and the bistable multivibrator 534 is toggled to enable the down counting gate 526 to cause the counter circuit 510 to count down from the value preset into the counters 512 and 514 by the output of the latch 416. The counters 512 and 514 continue to count in the downward direction until a zero count is reached, at which point the monostable multivibrator 536 (FIG. 17) is again triggered to terminate the counting sequence. A gate 538 is used to bypass the counter 514 to provide a narrow border when a hard border effect is selected. The gate 538 is enabled by applying a high state (HARD BORD) signal to an input 540 of the gate 538. Also, as in the systems previously described, the border counter circuit 510 may be disabled when a nonsymmetrical effect is desired by the application of a low state (NON SYM) signal to an input 542 of a NAND gate 544. This prevents the bistable multivibrator 524 from being toggled by the horizontal transition signal received from a monostable multivibrator 546.

A vertical border counter circuit 510' analogous to the horizontal border circuit 510 is employed to generate the vertical border. The vertical border counter circuit 510' employs similar components to the components used in the horizontal border counter 510, and analogous components are designated by similar reference numerals, with the components in the vertical border counter circuit 510' being designated by primed numbers.

The outputs of the horizontal and vertical border counters 510 and 510' are applied to a pair of respective horizontal and vertical ramp generators which provide horizontal and vertical ramps having a slope proportional to the count in the latches 416 and 484. These ramp generators are similar to the ramp generators previously described.

The outputs of the ramp generators 550 and 552 are connected to a switching circuit 553 which selects the output of one of the ramp generators 550 and 552 depending on the relative count in the horizontal and vertical border counter circuits 510 and 510'. The selection is accomplished by means of a comparator circuit comprising a pair of comparators 554 and 556 (FIG. 20) which compare the counts present in the horizontal and vertical counter circuits 510 and 510' and provide a first state output signal when the count in the counter circuit 510 is larger, and a second state output signal when the count in the counter circuit 510' is larger. This output signal is used to control a pair of 3-input AND gates 558 and 560 (FIG. 18) which operate the switching circuit 553. The switching circuit 553 includes an analog video switch for gradually switching between a first and a second video signal under the control of one of the ramp generators and logic circuitry for determining whether the output of either the horizontal ramp generator 550 or the vertical ramp generator 552 controls the video switch. The comparators 554 and 556 serve the same function as the nonadditive mixer 44 described in FIGS. 1–11, and determine whether the video is selected by the horizontal ramp generator 550 or the vertical ramp generator 552.

The output signal from the comparator 556 is applied to the gates 558 and 560 by means of an exclusive-NOR gate 562, a pair of NAND gates 564 and 566 and an inverter 568. The inverter 568 serves to invert the signal applied to the gate 558 to thereby cause the gates 558 and 560 to be alternately enabled by the output of the comparator 556. This causes the switch 563 to switch the higher amplitude signal from the ramp generators 550 and 552 to an output line 570. The polarity of the signal at the output of the gate 562 is controlled by applying a signal to an input 572 of the gate 562 to cause the gate 562 to invert the polarity of the signal received from the comparator 556 when a low state POLARITY signal is applied to the input 572 if opposite polarity switching of the gates 558 and 560 is desired.

The output switching circuit also contains three NAND gates 574, 576 and 578 and a NOR gate 580 for disabling the gates 564 and 566 or the gates 558 and 560 to inhibit either the horizontal or the vertical border when necessary, for example, when it extends beyond the corners of a central image. Such circuitry is relatively straightforward, and similar circuitry is illustrated in U.S. application Ser. No. 554,715 filed Mar. 3, 1975, entitled "Video Special Effects Generator," now U.S. Pat. No. 3,944,731, and incorporated herein by reference.

A 4-input NAND gate 582, driving the gates 558 and 560 through an inverter 584, inhibits the gates 558 and 560 during the blanking interval, when a hard border is selected and when either a horizontal or a vertical counter reaches its limit. This assures that video, rather than a border signal is applied to the output 570 of the switch 553 during the blanking intervals and when a horizontal or a vertical limit is reached to assure that the video synchronizing signals rather than border signals are applied to the line 570 at these times. The gates 558 and 560 are inhibited when a hard border is selected so that the switching of the video signals may be accomplished by a hard border signal, such as the V PATT or H PATT signal (not shown connected to the switch 553). Finally, a circuit comprising a bistable multivibrator 586, four NAND gates 588, 590, 592 and 594 and an inverter 596 controls the position of the vertical border (horizontally disposed) relative to the vertical border transition signal. A similar circuit comprising a bistable multivibrator 596, NAND gates 598, 600, 602 and 604 and an inverter 606 controls the position of the horizontal border (vertically disposed) relative to the horizontal transition signal. The last-mentioned border position control circuits control a 3-input NAND gate 610 that keys in the appropriate border signal when a matte border is selected. The output of the gate 610 controls a separate video switch (not shown) that switches the border signal.

Figure 18:
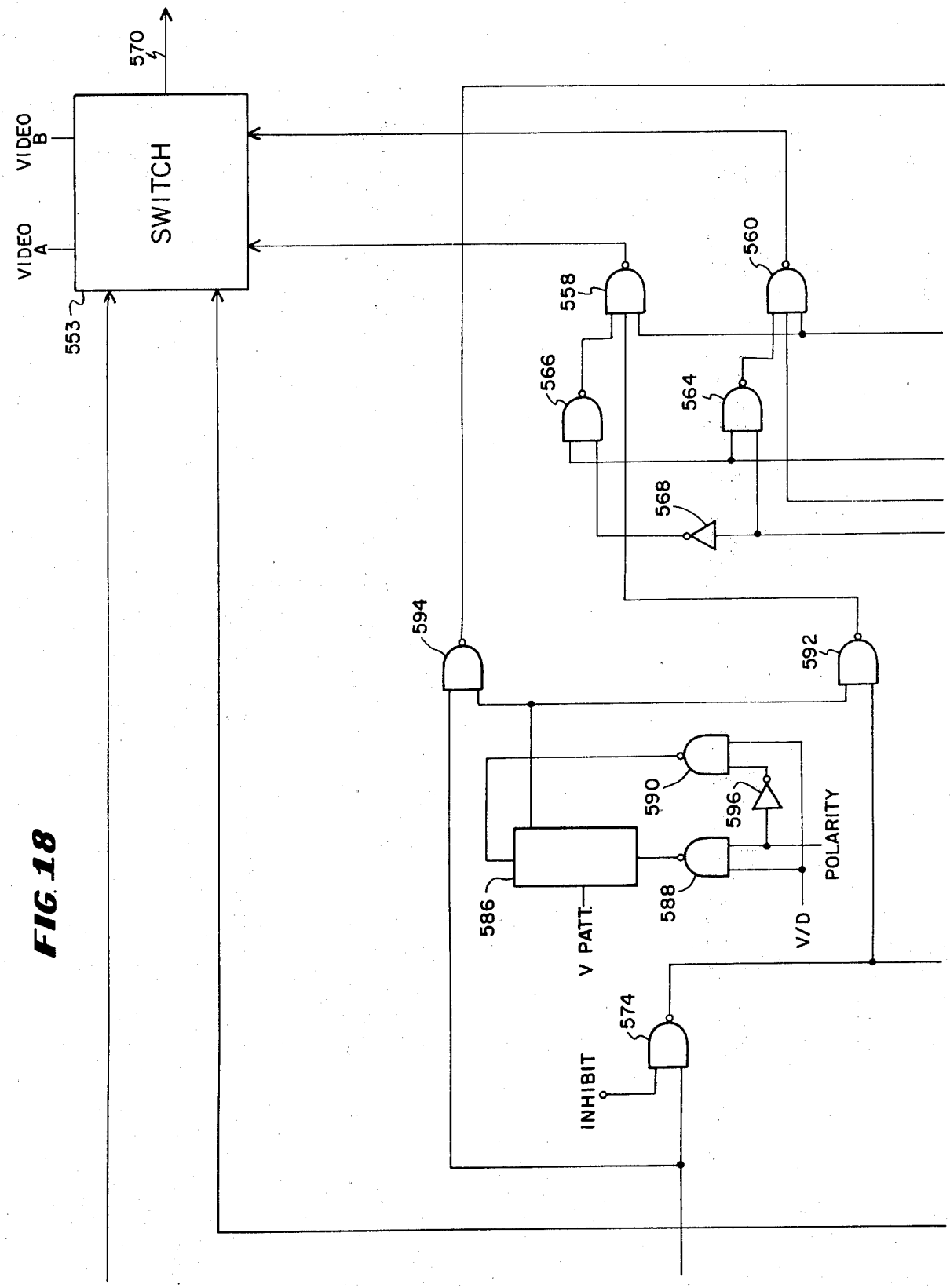
Figure 19:
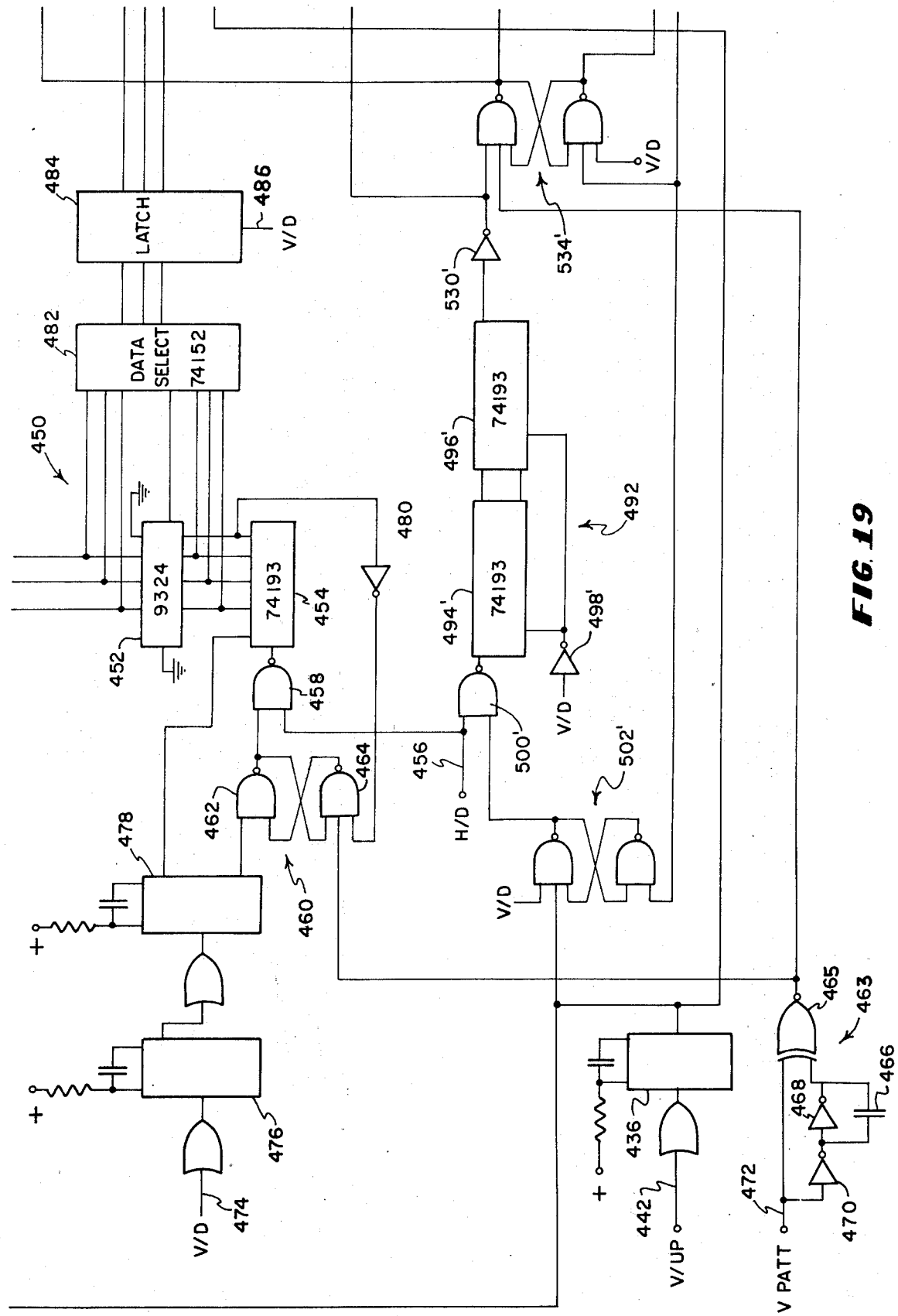
Figure 20:
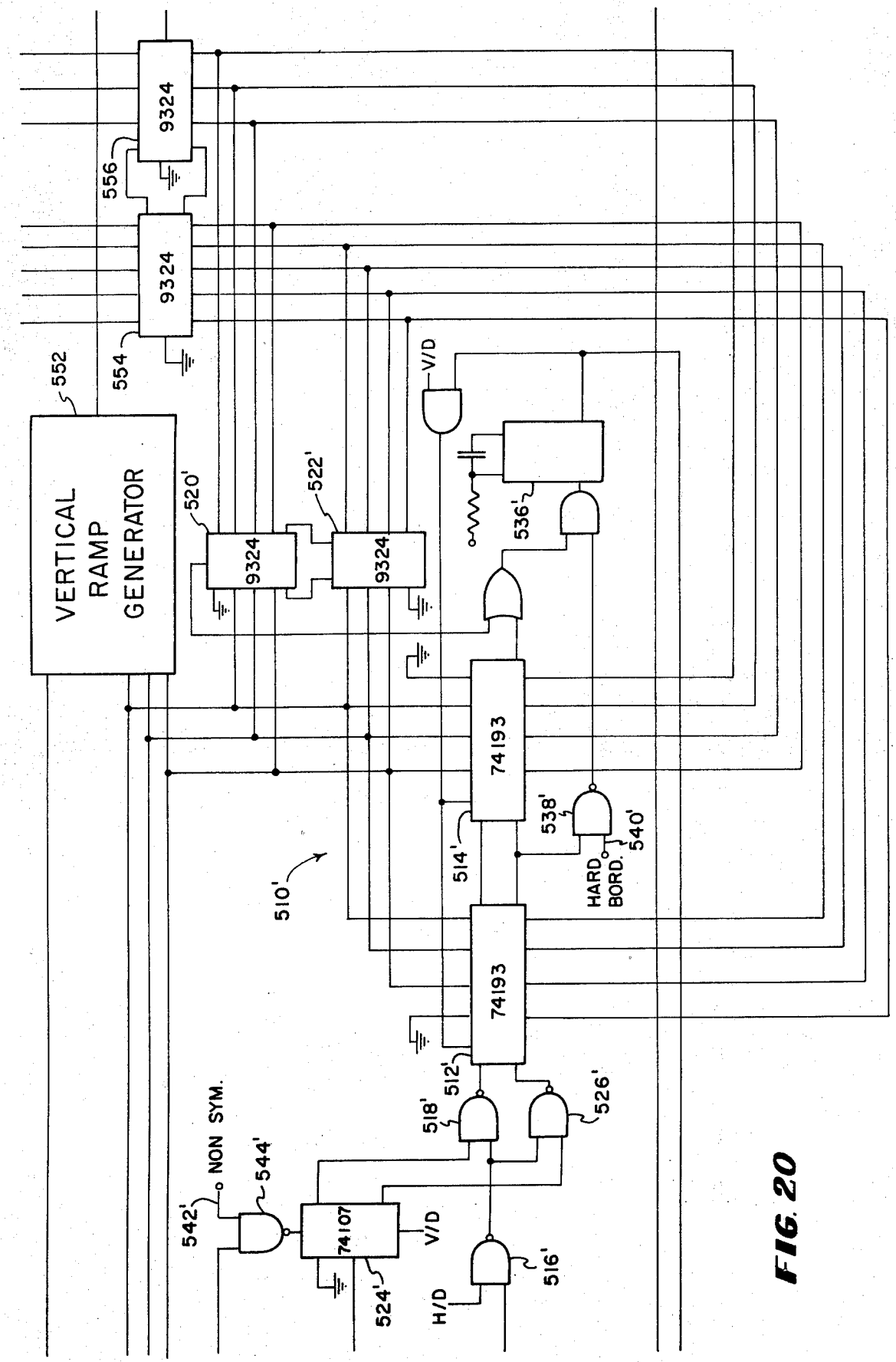

The control circuitry illustrated in FIGS. 18 and 21 with the exception of the switch 553 serves as an effects selector similar to the effects selector 45 of FIG. 1. A variety of such circuits may be employed in conjunction with the transition circuits of the present invention to achieve a variety of special effects; however, such circuits will not be discussed in detail because of the large number of circuits possible. Typical effects selector circuits are illustrated in the previously referenced U.S. Pat. No. 3,821,468 and U.S. Patent application Ser. No. 554,715 filed Mar. 3, 1975, now U.S. Pat. No. 3,944,731.

While certain preferred embodiments of the invention have been described by way of illustration, many modifications will occur to those skilled in the art; it will be understood, of course, that it is not desired that the invention be limited thereto, since modifications may be made, and it is, therefore, contemplated by the appended claims to cover any such modifications as fall within the true scope and spirit of the invention.

What is claimed as new and desired to be secured by Letters Patent of the United States is:

1. A soft edge transition system for use with a special effects generator providing a transition signal for rendering said transition system operative to switch one of first and second video input signals into a video output signal under the control of synchronizing signals, said transition system comprising:
    means responsive to said transition signal for gradually switching said first video input signal out of said video output signal and switching said second video input signal into said video output signal, said switching means including means for determining the time duration of the transition between the initiation and completion of the gradual switching between said first and second video input signals;
    means responsive to said synchronizing signals for determining the time interval between a predetermined datum and a predetermined point of the gradual switching by said switching means, said time interval determining means being operative to cause said transition duration determining means to alter the duration of the transition between said first and second video signals when said time interval reaches a predetermined duration.

2. A soft edge transition system as recited in claim 1 wherein said predetermined datum is the most recent synchronizing signal.

3. A soft edge transition system as recited in claim 2 wherein said predetermined point during the gradual switching by said switching means is the initiation of said gradual switching.

4. A soft edge transition system as recited in claim 3 wherein said time interval determining means includes means for gradually reducing the duration of the transition between the initiation and completion of the gradual switching by said switching means when the time interval between the most recent synchronizing signal and the initiation of said gradual switching is less than the original time interval between the initiation and the completion of the gradual switching.

5. A soft edge transition system as recited in claim 4 wherein said transition duration determining means includes an analog ramp generator.

6. A soft edge transition system as recited in claim 4 wherein said time interval determining means includes a digital counter circuit connected to said transition duration determining means, said digital counter circuit being responsive to transition signals for providing a digital signal representative of said time interval to said transition duration determining means for altering the duration of said transition.

7. A soft edge transition system for use with a special effects generator providing transition signals for rendering said transition system operative to switch one of first and second video input signals into a video output signal under the control of synchronizing signals, said transition system comprising:
    first means responsive to a first transition signal for gradually switching said first video input signal out of said video output signal and switching said second video input signal into said video output signal;
    second means responsive to a second transition signal for gradually switching said first video input signal out of said video output signal and switching said second video input signal into said video output signal;
    first timing means responsive to first synchronizing signals and said first switching means for determining the time interval between a first predetermined datum and the completion of the gradual switching by said first switching means;
    second timing means responsive to second synchronizing signals and said second switching means for determining the time interval between a second predetermined datum and the completion of the gradual switching by said second switching means;
    means for generating a first intermediate point signal representative of a predetermined point in the interval between first synchronizing signals and for generating a second intermediate point signal representative of a predetermined point in the interval between second synchronizing signals;

means operatively coupled to said first and second switching means and responsive to said intermediate point signal generating means and to said first and second timing means for rendering said first and second switching means operative gradually to switch said second video input signal out of said video output signal and said first video input signal into said video output signal; and means coupled to said first and second switching means for selectively disabling one of said first and second switching means.

8. A soft edge transition system as recited in claim 7 wherein said first and second synchronizing signals are horizontal and vertical synchronizing signals, respectively, and said first predetermined datum is the most recent horizontal synchronizing signal and said second predetermined datum is the most recent vertical synchronizing signal.

9. A soft edge transition system as recited in claim 8 wherein said first and second timing means include means for determining said time intervals digitally.

10. A soft edge transition system as recited in claim 9 wherein said digital time interval determining means each include a source of periodic signals and means for counting said periodic signals, said counting means including means responsive to each of said synchronizing signals for initiating the counting of said respective periodic signals and means responsive to one of said gradual switching means for suspending the counting of said periodic signals upon the completion of the gradual switching thereby.

11. A soft edge transition system as recited in claim 8 further including means for determining a first time interval between said most recent horizontal synchronizing signal and a predetermined portion of the gradual switching by said first switching means, and for determining a second time interval between said most recent vertical synchronizing signal and a predetermined portion of the gradual switching by said second switching means, said first and second time interval determining means including means for altering the rate of said gradual switching by one of said first and second switching means, said rate altering means being operative for increasing the rate of said gradual switching by said first switching means when said first time interval is less than a first predetermined time interval, and for increasing the rate of said gradual switching by said second switching means when said second time interval is less than a second predetermined time interval.

12. A soft edge transition system as recited in claim 11 wherein said rate altering means includes means for increasing the rate of said gradual switching by both of said first and second switching means when one of said first and second time intervals is less than a respective one of said first and second predetermined time intervals.

13. A soft edge transition system as recited in claim 12 wherein said one of said first and second time intervals is said first time interval.

14. A soft edge transition system as recited in claim 13 wherein said second switching means is responsive only to said second time interval for increasing said switching rate.

15. A soft edge transition system as recited in claim 12 wherein said rate of switching by one of said first and second switching means is adjusted to make the switching time interval required to complete the gradual switching proportional to one of said first and second time intervals when one of said first and second time intervals is less than a respective one of said first and second predetermined time intervals.

16. A soft edge transition system as recited in claim 8 wherein said first gradual switching means includes means for generating a first gradually varying control signal and said second gradual switching means includes means for generating a second gradually varying control signal.

17. A soft edge transition system as recited in claim 16 further including means connected to said first and second control signal generating means for comparing the amplitudes of said first and second control signals and for providing a switching signal proportional to the one of said first and second control signals having a predetermined amplitude relationship to the other of said first and second control signals.

18. A soft edge transition system as recited in claim 17 wherein said amplitude comparing means includes means for providing a switching signal having an amplitude proportional to the larger of said first and second control signals.

19. A soft edge transition system as recited in claim 17 wherein said amplitude comparing means includes a nonadditive mixer.

20. A soft edge transition system as recited in claim 16 wherein one of said control signal generating means includes an analog ramp generator.

21. A soft edge transition system as recited in claim 20 wherein said analog ramp generator includes a source of charging current, a plurality of capacitors and means for selectively connecting said capacitors in circuit with said charging current source to be charged thereby, said selective connecting means being operative to alter the slope of said control signal.

22. A soft edge transition system as recited in claim 21 wherein said source of charging current includes a constant current source.

23. A soft edge transition system as recited in claim 21 further including a second charging current source for selectively applying to said capacitors a charging current having a polarity opposite to the polarity of the current provided by said charging current source.

24. A system as recited in claim 18 further including an analog video switch coupled to said switching signal providing means and responsive thereto for gradually switching one of said first and second video signals into said video output signal.

25. A soft edge transition system as recited in claim 8 wherein said first gradual switching means includes means for generating a first control signal having a gradually varying amplitude and said second gradual switching means includes means for generating a second control signal having a gradually varying amplitude, said system further including digital means for providing first and second digital signals each having a value related to the amplitude of one of said first and second control signals, and means coupled to said digital signal providing means for comparing the values of said first and second digital signals and for providing a switching signal having an amplitude proportional to the amplitude of one of said control signals in response to the relative values of said first and second digital signals.

26. A soft edge transition system as recited in claim 25 wherein said comparing means includes means for providing a switching signal having an amplitude proportional to the amplitude of the control signal corresponding to the digital signal having the higher value.

27. A soft edge transition system as recited in claim 25 wherein said digital signal providing means includes first and second counters.

28. A soft edge transition system as recited in claim 25 wherein said first and second control signal generating means each include an analog ramp generator.

29. The method for providing a symmetrical soft edge video special effect comprising the steps of:
  initiating a gradual transition between first and second video signals;
  generating an indication of the location on a video image of the transition;
  generating an indication of the location of a datum on the video image; and
  reducing the transition time of the gradual transition when the transition is positioned less than a predetermined distance from the datum.

30. The method recited in claim 29 wherein said datum is the initiation of a scan.

31. The method recited in claim 29 wherein the step of altering the transition duration includes the step of reducing the transition duration when the transition approaches the datum by a distance less than the original transition duration.

32. A soft edge transition system for use with a special effects generator providing transition signals for rendering said transition system operative to switch one of first and second video input signals into a video output signal under the control of synchronizing signals, said transition system comprising:
  means responsive to a first transition signal for gradually switching said first video input signal out of said video output signal and for switching said second video input signal into said video output signal, said switching means including analog means for determining the time duration of the transition between the initiation and completion of the gradual switching between said first and second video input signals;
  digital timing means responsive to synchronizing signals and to said switching means for determining the time interval between a first predetermined datum and the completion of the gradual switching by said switching means; and
  means for generating an intermediate point signal representative of a predetermined point in the interval between synchronizing signals, said digital timing means being responsive to said intermediate point generating means for generating a control signal a predetermined time interval subsequent to the generation of said intermediate point signal, said predetermined time interval being equal to the timing interval between the completion of said gradual switching and said predetermined datum, said analog switching means being responsive to the control signal from said digital timing means for gradually switching said second video input signal out of said video output signal and said first video input signal into said video output signal.

33. A soft edge transition system as recited in claim 32 wherein said digital time interval determining means includes a source of periodic signals and means for counting said periodic signals, said counting means including means responsive to each of said synchronizing signals for initiating the counting of said respective periodic signals and means responsive to said gradual switching means for suspending the counting of said periodic signals upon the completion of the gradual switching thereby.

34. A soft edge transition system as recited in claim 33 wherein said analog time duration determining means includes analog means for generating a first gradually varying control signal.

35. A soft edge transition system as recited in claim 34 wherein said gradually varying control signal generating means includes an analog ramp generator.

36. A soft edge transition system as recited in claim 35 wherein said analog ramp generator includes a source of charging current, a plurality of capacitors and means for selectively connecting said capacitors in circuit with said charging current source to be charged thereby, said selective connecting means being operative to alter the slope of said control signal to thereby alter the switching rate of said gradual switching means.

* * * * *